United States Patent
Makida et al.

(10) Patent No.: US 10,097,635 B2
(45) Date of Patent: Oct. 9, 2018

(54) STORAGE MANAGEMENT DEVICE, AND PERFORMANCE TUNING METHOD

(71) Applicant: FUJITSU LIMITED, Kawasaki-shi, Kanagawa (JP)

(72) Inventors: Toshiharu Makida, Numazu (JP); Kiyoshi Sugioka, Mishima (JP); Jouichi Bita, Kahoku (JP)

(73) Assignee: FUJITSU LIMITED, Kawasaki (JP)

(*) Notice: Subject to any disclaimer, the term of this patent is extended or adjusted under 35 U.S.C. 154(b) by 380 days.

(21) Appl. No.: 14/629,822

(22) Filed: Feb. 24, 2015

(65) Prior Publication Data

US 2015/0281357 A1    Oct. 1, 2015

(30) Foreign Application Priority Data

Mar. 27, 2014  (JP) .................................. 2014-066774

(51) Int. Cl.
  *G06F 15/16* (2006.01)
  *H04L 29/08* (2006.01)
  (Continued)

(52) U.S. Cl.
  CPC .......... *H04L 67/1097* (2013.01); *G06F 3/061* (2013.01); *G06F 3/0604* (2013.01);
  (Continued)

(58) Field of Classification Search
  None
  See application file for complete search history.

(56) References Cited

U.S. PATENT DOCUMENTS 5,933,604 A   8/1999  Inakoshi
6,651,153 B1* 11/2003 Orfali ................. G06F 11/3447
                                                711/133

(Continued)

FOREIGN PATENT DOCUMENTS

EP    1635251 A1    3/2006
EP    2608011 A1    6/2013

(Continued)

OTHER PUBLICATIONS

Extended European Search Report dated Jul. 15, 2015 for corresponding European Patent Application No. 15156570.2, 7 pages.

(Continued)

*Primary Examiner* — Esther B Henderson
(74) *Attorney, Agent, or Firm* — Fujitsu Patent Center

(57) ABSTRACT

A reception unit receives an input of designation of a performance level for a volume. A target value calculation unit obtains a target value of performance of data transmission and reception with respect to the volume according to the input performance level. A setting unit sets the target value obtained by the target value calculation unit for the volume. A monitoring unit monitors a load factor of a transmission resource. A bandwidth management unit identifies a target transmission resource based on the load factor of the transmission resource, decides a bandwidth allocation to a memory unit that uses the target transmission resource based on the target value, and instructs a bandwidth control unit of a storage device to tune the bandwidth using the decided bandwidth allocation.

13 Claims, 18 Drawing Sheets

(51) Int. Cl.
*G06F 3/06* (2006.01)
*H04L 12/911* (2013.01)
*H04L 12/26* (2006.01)

(52) U.S. Cl.
CPC ............ *G06F 3/067* (2013.01); *G06F 3/0631* (2013.01); *G06F 3/0653* (2013.01); *H04L 43/0876* (2013.01); *H04L 47/783* (2013.01)

(56) References Cited

U.S. PATENT DOCUMENTS

| | | | |
|---|---|---|---|
| 7,149,807 | B1 | 12/2006 | Kontothanassis |
| 7,428,624 | B2 | 9/2008 | Fujita et al. |
| 7,467,263 | B2 | 12/2008 | Ozaki et al. |
| 8,040,811 | B2 | 10/2011 | Edwards et al. |
| 8,060,643 | B2 | 11/2011 | Messick et al. |
| 8,234,415 | B2 | 7/2012 | Bita |
| 8,621,178 | B1 | 12/2013 | Lazar |
| 9,313,274 | B2 | 4/2016 | Adriaens et al. |
| 2001/0029502 | A1 | 10/2001 | Oeda |
| 2002/0004883 | A1 | 1/2002 | Nguyen et al. |
| 2003/0169688 | A1 | 9/2003 | Mott |
| 2004/0117369 | A1 | 6/2004 | Mandel et al. |
| 2004/0122938 | A1 | 6/2004 | Messick et al. |
| 2004/0123180 | A1* | 6/2004 | Soejima ............ G06F 11/1096 714/5.1 |
| 2004/0123297 | A1* | 6/2004 | Flautner ............ G06F 1/3203 718/102 |
| 2005/0022201 | A1 | 1/2005 | Kaneda et al. |
| 2006/0072608 | A1 | 4/2006 | Miyawaki et al. |
| 2006/0265608 | A1 | 11/2006 | Fung |
| 2007/0050684 | A1 | 3/2007 | Takaoka et al. |
| 2007/0283107 | A1 | 12/2007 | Ozaki et al. |
| 2007/0283120 | A1 | 12/2007 | Fujita et al. |
| 2008/0126734 | A1* | 5/2008 | Murase ............ G06F 3/0613 711/170 |
| 2008/0141261 | A1 | 6/2008 | Machida |
| 2008/0294758 | A1 | 11/2008 | Xiao et al. |
| 2008/0301164 | A1 | 12/2008 | Isobe |
| 2008/0313641 | A1* | 12/2008 | Inoue ............ G06F 3/061 718/104 |
| 2010/0100604 | A1 | 4/2010 | Fujiwara et al. |
| 2010/0220510 | A1* | 9/2010 | Shalvi ............ G11C 8/12 365/63 |
| 2012/0027024 | A1 | 2/2012 | Liang |
| 2012/0166748 | A1 | 6/2012 | Satoyama et al. |
| 2012/0173709 | A1 | 7/2012 | Li et al. |
| 2012/0278511 | A1 | 11/2012 | Alatorre et al. |
| 2012/0311602 | A1 | 12/2012 | Deguchi et al. |
| 2013/0151646 | A1 | 6/2013 | Chidambaram et al. |
| 2013/0159557 | A1 | 6/2013 | Bita |
| 2013/0204960 | A1 | 8/2013 | Ashok et al. |
| 2013/0232261 | A1* | 9/2013 | Wright ............ H04L 41/50 709/224 |
| 2013/0262649 | A1 | 10/2013 | Shimmitsu et al. |
| 2015/0139108 | A1 | 5/2015 | Takano |
| 2015/0277767 | A1 | 10/2015 | Hamano et al. |
| 2015/0282175 | A1 | 10/2015 | Dai et al. |

FOREIGN PATENT DOCUMENTS

| | | |
|---|---|---|
| EP | 2854018 A1 | 4/2015 |
| JP | 6-250795 A | 9/1994 |
| JP | 8-255113 A | 10/1996 |
| JP | 2004-199697 A | 7/2004 |
| JP | 2005-25422 | 1/2005 |
| JP | 2005-50007 A | 2/2005 |
| JP | 2006-108955 A | 4/2006 |
| JP | 2009-282664 A | 12/2009 |
| JP | 2010-97526 A | 4/2010 |
| JP | 2010-287097 A | 12/2010 |
| JP | 2013-536478 | 9/2013 |
| JP | 2013-206229 | 10/2013 |
| WO | 03027856 A1 | 4/2003 |
| WO | 2012090247 | 7/2012 |
| WO | 2013101947 | 7/2013 |

OTHER PUBLICATIONS

Japanese Office Action dated Oct. 3. 2017 for Japanese Patent Application No. 2014-066774, with English Translation, 7 pages.
U.S. Non-Final Office Action dated Jul. 26, 2017 for co-pending U.S. Appl. No, 14/469,763, 23 pages.
U.S. Non-Final Office Action dated Nov. 30, 2017 for co-pending U.S. Appl. No. 14/469,763, 27 pages.
Japanese Office Action dated Apr. 4, 2017 for Japanese Patent Application No. 2013-202653, with Partial English Translation, 6 pages.
European Office Action dated Jul. 5, 2016 for European Patent Application No. 14182297.3, 4 pages.
Extended European Search Report dated Feb. 18, 2015 for European Patent Application No. 14182297.3, 7 pages.
U.S. Notice of Allowance dated Aug. 27, 2018 for copending U.S. Appl. No. 14/469,763, 32 pages.

* cited by examiner

FIG.10

| PERFORMANCE | TARGET RESPONSE TIME | | TARGET IOPS | | TARGET THROUGHPUT | |
|---|---|---|---|---|---|---|
| | AT CACHE HIT | AT CACHE MISS | AT CACHE HIT | AT CACHE MISS | AT CACHE HIT | AT CACHE MISS |
| HIGH PERFORMANCE | 1 ms/MB | 10 ms/MB | | | | |
| MIDDLE PERFORMANCE | | | 100 | 10 | | |
| LOW PERFORMANCE | | | | | 10 MB/s | 1 MB/s |

FIG.11

| PERFORMANCE | TARGET RESPONSE TIME | | TARGET IOPS | | TARGET THROUGHPUT | |
|---|---|---|---|---|---|---|
| | AT CACHE HIT | AT CACHE MISS | AT CACHE HIT | AT CACHE MISS | AT CACHE HIT | AT CACHE MISS |
| INTERACTION HIGH PERFORMANCE | 1 ms/MB | 10 ms/MB | | | | |
| INTERACTION MIDDLE PERFORMANCE | 5 ms/MB | 50 ms/MB | | | | |
| INTERACTION LOW PERFORMANCE | 10 ms/MB | 100 ms/MB | | | | |
| DB HIGH PERFORMANCE | | | 100 | 1000 | | |
| DB MIDDLE PERFORMANCE | | | 10 | 100 | | |
| DB LOW PERFORMANCE | | | 1 | 10 | | |
| BACKUP HIGH PERFORMANCE | | | | | 10 MB/s | 100 MB/s |
| BACKUP MIDDLE PERFORMANCE | | | | | 2 MB/s | 20 MB/s |
| BACKUP LOW PERFORMANCE | | | | | 1 MB/s | 4 MB/s |

FIG.12

| PERFORMANCE | CALCULATION PARAMETER FOR TARGET RESPONSE TIME PER IO UNIT SIZE | | | |
|---|---|---|---|---|
| | AT CACHE HIT | | AT CACHE MISS | |
| | PROPORTIONAL CONSTANT NUMBER | FIXED TIME | PROPORTIONAL CONSTANT NUMBER | FIXED TIME |
| HIGH PERFORMANCE | 1 ms/MB | 0 ms | 10 ms/MB | 0.5 ms |
| MIDDLE PERFORMANCE | 5 ms/MB | 0 ms | 50 ms/MB | 0.5 ms |
| LOW PERFORMANCE | 10 ms/MB | 0 ms | 100 ms/MB | 0.5 ms |

FIG.13

| PERFOR-MANCE | CALCULATION PARAMETER FOR TARGET RESPONSE TIME PER IO UNIT SIZE | | | | | | | |
|---|---|---|---|---|---|---|---|---|
| | AT CACHE HIT | | AT CACHE MISS | | | | | |
| | | | SSD | | ONLINE | | NEARLINE | |
| | PROPOR-TIONAL CONSTANT NUMBER | FIXED TIME | PROPOR-TIONAL CONSTANT NUMBER | FIXED TIME | PROPOR-TIONAL CONSTANT NUMBER | FIXED TIME | PROPOR-TIONAL CONSTANT NUMBER | FIXED TIME |
| HIGH PERFOR-MANCE | 1 ms/MB | 0 ms | 2 ms/MB | 0.1 ms | 5 ms/MB | 0.2 ms | 10 ms/MB | 0.5 ms |
| MIDDLE PERFOR-MANCE | 5 ms/MB | 0 ms | 10 ms/MB | 0.1 ms | 25 ms/MB | 0.2 ms | 50 ms/MB | 0.5 ms |
| LOW PERFOR-MANCE | 10 ms/MB | 0 ms | 25 ms/MB | 0.1 ms | 50 ms/MB | 0.2 ms | 100 ms/MB | 0.5 ms |

| VOLUME IDENTIFICATION INFORMATION | PARTITION NUMBER | ACCESS NUMBER ||||| 
|---|---|---|---|---|---|---|
| | | 09:55 | 10:00 | 10:01 | 10:02 | 10:03 |
| Storage=1, VolNo=1 | 1 | 100 | 50 | 60 | 70 | 30 |
| | 2 | 90 | 0 | 100 | 100 | 10 |
| | 3 | 0 | 10 | 20 | 30 | 0 |

147

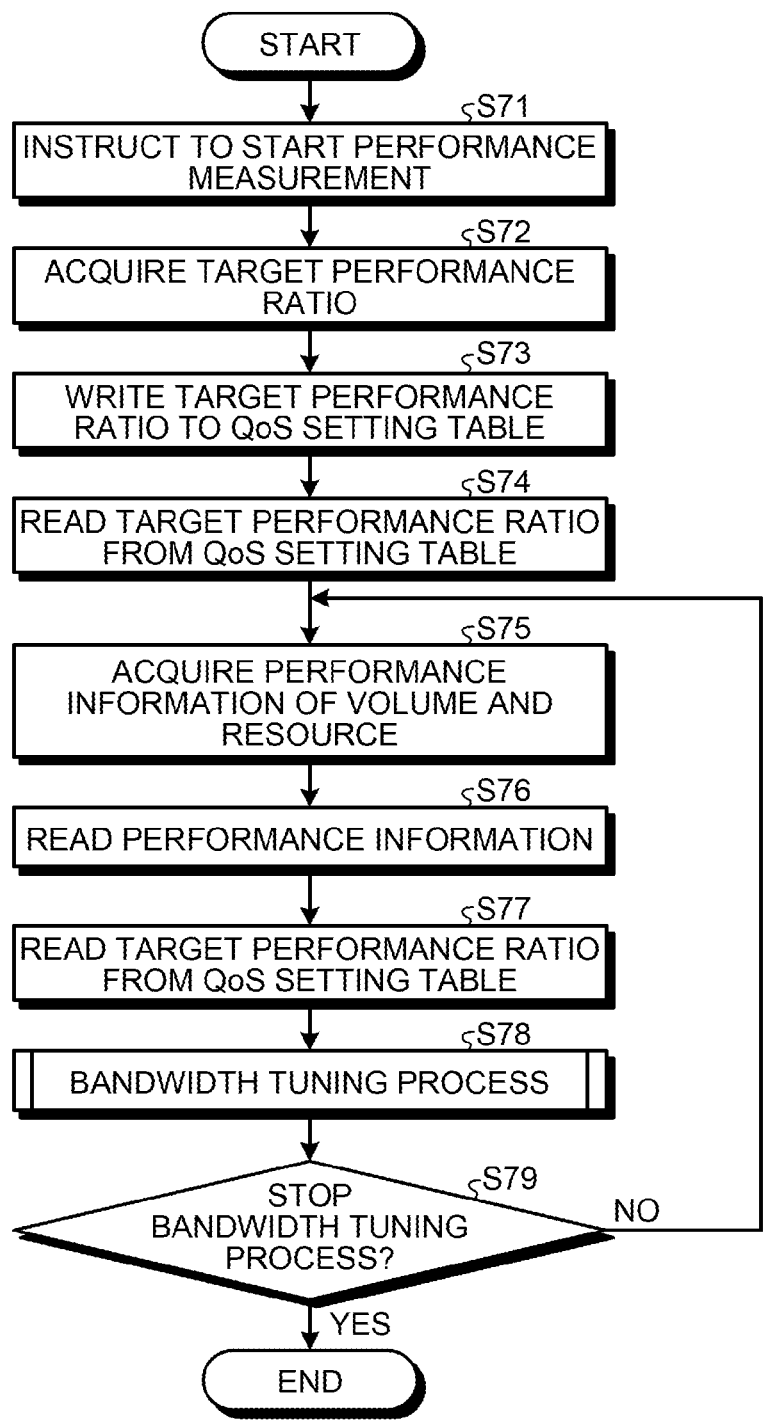

| VOLUME IDENTIFICATION INFORMATION | DESIGNATION METHOD | PERFORMANCE LEVEL | TARGET RESPONSE TIME |
|---|---|---|---|
| Storage=1, VolNo=1 | PERFORMANCE LEVEL | HIGH PERFORMANCE | - |
| Storage=1, VolNo=2 | PERFORMANCE LEVEL | MIDDLE PERFORMANCE | - |
| Storage=2, VolNo=1 | PERFORMANCE LEVEL | LOW PERFORMANCE | - |
| Storage=2, VolNo=2 | NUMERICAL VALUE | - | 1 ms |

| VOLUME IDENTIFICATION INFORMATION | PERFORMANCE LEVEL | ACHIEVEMENT RATE | BANDWIDTH THROTTLING RANGE |
|---|---|---|---|
| Storage=1, VolNo=1 | HIGH PERFORMANCE | 90% | 50 MB/s |
| Storage=1, VolNo=2 | MIDDLE PERFORMANCE | 110% | 60 MB/s |
| Storage=2, VolNo=1 | LOW PERFORMANCE | 100% | 30 MB/s |

| VOLUME IDENTIFICATION INFORMATION | PERFORMANCE LEVEL | ACHIEVEMENT RATE | BANDWIDTH THROTTLING RANGE |
|---|---|---|---|
| Storage=1, VolNo=1 | HIGH PERFORMANCE | 90% | 50 MB/s |
| Storage=1, VolNo=2 | MIDDLE PERFORMANCE | 55% | 60 MB/s |
| Storage=2, VolNo=1 | LOW PERFORMANCE | 25% | 30 MB/s |

STORAGE MANAGEMENT DEVICE, AND PERFORMANCE TUNING METHOD

CROSS-REFERENCE TO RELATED APPLICATION

This application is based upon and claims the benefit of priority of the prior Japanese Patent Application No. 2014-066774, filed on Mar. 27, 2014, the entire contents of which are incorporated herein by reference.

FIELD

The embodiments discussed herein are directed to a storage management device, a performance tuning method, and a performance tuning program.

BACKGROUND

Recently, virtualization of an open system or a server has become widely used and the system management has been complicated. Thus, in view of simplification of the system management and flexibility with rapidly-increased data amount, a storage system has commonly been introduced.

In a storage system, for example, a storage system performance tuning is executed by tuning a bandwidth throttling range of a data transfer path between a volume and a server that runs an application. Conventionally, the storage system executes tuning of the bandwidth throttling range upon receiving an instruction from an administrator.

Further, there is a conventional art that restricts storage performance based on a service level designated by a user. Further, there is a conventional art that receives designation of levels of plural items that affect the performance from a user and restricts the storage performance based on the designation.

Patent Document 1: Japanese Laid-open Patent Publication No. 2013-206229
Patent Document 2: Japanese Laid-open Patent Publication No. 2005-25422

However, when a plurality of volumes share a single transmission path, competition occurs during data transfer and achievement to a target performance becomes difficult. Thus, in order to achieve target performance, the administrator designates the volumes in which competition occurs during data transfer as monitoring the operation condition and instructs the storage system to degenerate a bandwidth throttling range of one of the volumes. Then, the storage system degenerates the bandwidth of the volume in response to the instruction from the administrator.

Here, there are plural transmission resources which can cause performance deterioration in the path from the application to the volume. As such resources, there are a redundant array of inexpensive disks (RAID) group, a processing processor, a port, and a switch port, for example. Each resource has different volumes sharing the resource. Thus, in a case of a conventional method that an administrator instructs a storage to tune a bandwidth throttling range, the administrator identifies the resources in which competition has occurred and decides a tuning method of the bandwidth throttling range of the volumes that share the identified resource. In other words, in the conventional method, the administrator's process is complicated and it is difficult to execute performance tuning of a storage system in a simple manner.

Further, in a conventional technique that restricts performance based on a designated level, since tuning is executed focusing on predetermined fixed target performance based on the designated level, setting of proper target performance is difficult and proper performance tuning of a storage system is difficult. Further, in a conventional technique in which levels of plural items are designated, setting of target values for the respective items is complicated and it is difficult to execute performance tuning of a storage system in a simple manner.

SUMMARY

According to an aspect of an embodiment, a storage management device that manages a storage device including a memory unit and executing data transmission and reception with respect to the memory unit via a transmission resource includes: a reception unit that receives an input of designation of a performance level for the memory unit; a target value calculation unit that obtains a target value of performance of data transmission and reception with respect to the memory unit according to the input performance level; a setting unit that sets the target value obtained by the target value calculation unit for the memory unit; a monitoring unit that monitors a load factor of the transmission resource; and a bandwidth management unit that identifies the transmission resource based on the load factor of the transmission resource, decides a bandwidth allocation for the memory unit that uses the identified transmission resource based on the target value, and instructs a bandwidth restriction unit of the storage device to tune the bandwidth using the decided bandwidth allocation.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

Regarding the storage management device, the performance tuning method, and the performance tuning program disclosed in this application, in one aspect, the storage management device manages a storage device including a memory unit and executing data transmission and reception to and from the memory unit via a transmission resource. Then, a reception unit receives an input of designation of a performance level for the memory unit. A target value calculation unit obtains a target value of performance of data transmission and reception for the memory unit based on the input performance level. A setting unit sets the target value obtained by the target value calculation unit for the memory unit. A monitoring unit monitors a load factor of the transmission resource. A bandwidth management unit designates a transmission resource based on the load factor of the transmission resource, decides a bandwidth allocation for the memory unit that uses the target transmission resource based on the target value, and instructs a bandwidth restriction unit of the storage device to tune the bandwidth using the decided bandwidth allocation.

BRIEF DESCRIPTION OF DRAWINGS

FIG. 10 is a diagram of an example of the setting file when a different performance index is used for each performance level;

FIG. 11 is a diagram of an example of the setting file when a different performance index is used for each application;

FIG. 12 is a diagram of an example of a setting file according to a second embodiment;

FIG. 13 is a diagram of an example of a setting file according to a third embodiment;

FIG. 17 is a flowchart of a bandwidth tuning process of an operation management server according to a fifth embodiment;

FIG. 19 is a diagram of an example of a performance setting table according to the sixth embodiment;

FIG. 20 is a diagram of an example of a target achievement rate notification screen;

DESCRIPTION OF EMBODIMENTS

Preferred embodiments of the present invention will be explained with reference to accompanying drawings. However, the storage management device, the performance tuning method and the performance tuning program disclosed in this application are not limited by the following embodiments.

[a] First Embodiment

Figure 1:
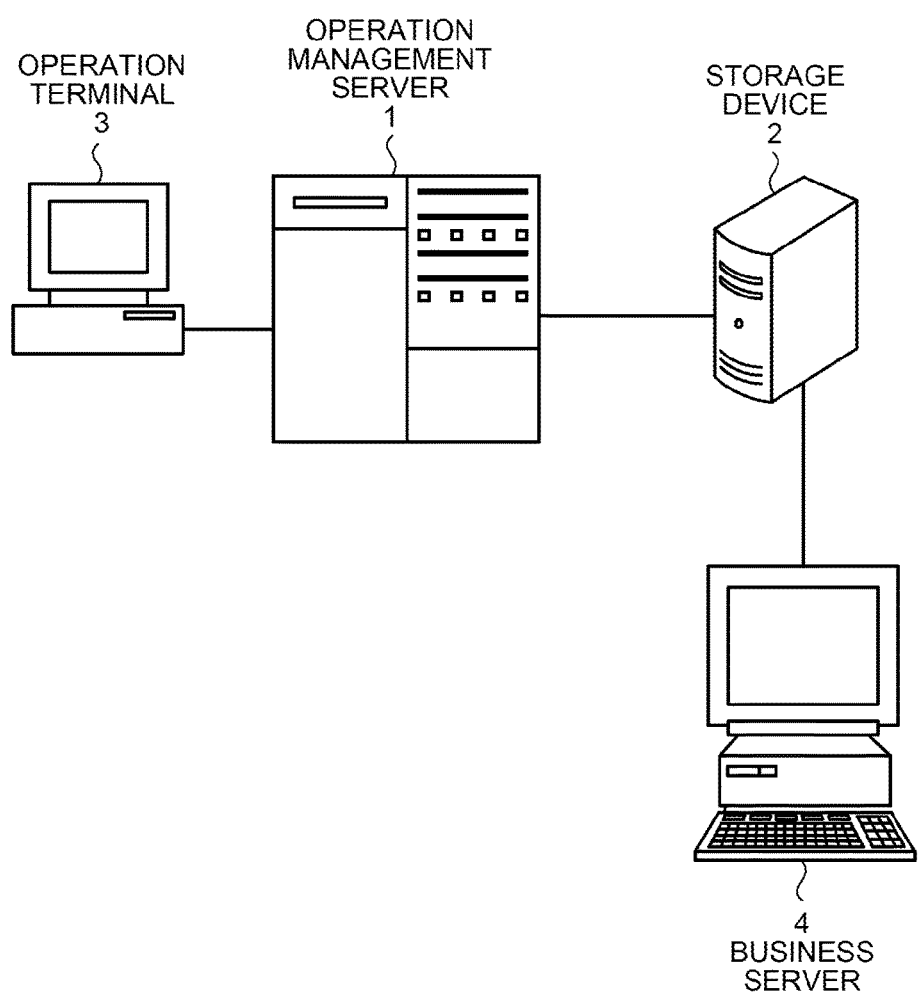
FIG. 1 is a general configuration diagram of a storage system according to a first embodiment.

FIG. 1 is a general configuration diagram of a storage system according to a first embodiment. As illustrated in FIG. 1, the storage system according to the present embodiment has an operation management server 1, a storage device 2, an operation terminal 3 and a business server 4. Here, in FIG. 1, a single storage device 2 is illustrated; however, the number of the storage devices 2 is not limited. Similarly, a single business server 4 is illustrated; however, the number of the business servers 4 is not limited.

The operation terminal 3 is connected to the operation management server 1 via a network. The operation terminal 3 transmits an instruction of a process for the storage device 2 or the like to the operation management server 1. Further, the operation terminal 3 displays a message or the like transmitted from the operation management server 1 on a monitor to notify to an operator. Further, the operation terminal 3 displays an input screen on the monitor upon receiving an instruction from a later described display control unit 105 of the operation management server 1.

The operation management server 1 executes operation and management of the storage device 2. The operation management server 1 executes a Quality of Service (QoS) control program and a storage management program. The operation management server 1 is an example of the "storage management device."

Concretely, the operation management server 1 executes control of QoS in the storage device 2. QoS is a performance setting function that helps the storage device 2 to maintain stable performance and executes tuning of a later described volume bandwidth or the like. Further, the operation management server 1 controls the storage device 2 according to an order input via the operation terminal 3. For example, the operation management server 1 instructs the storage device 2 to constitute a RAID which is input via the operation terminal 3.

The storage device 2 executes reading and writing data using QoS upon receiving an instruction from an application running on the business server 4. Further, the storage device 2 executes control of QoS upon receiving an instruction for tuning the volume bandwidth from the operation management server 1.

The business server 4 runs a business application. When running an application, the business server 4 writes or reads data to or from the storage device 2. The application run by the business server 4 is not limited as long as the application is for transmitting and receiving data to and from the storage device 2.

Figure 2:
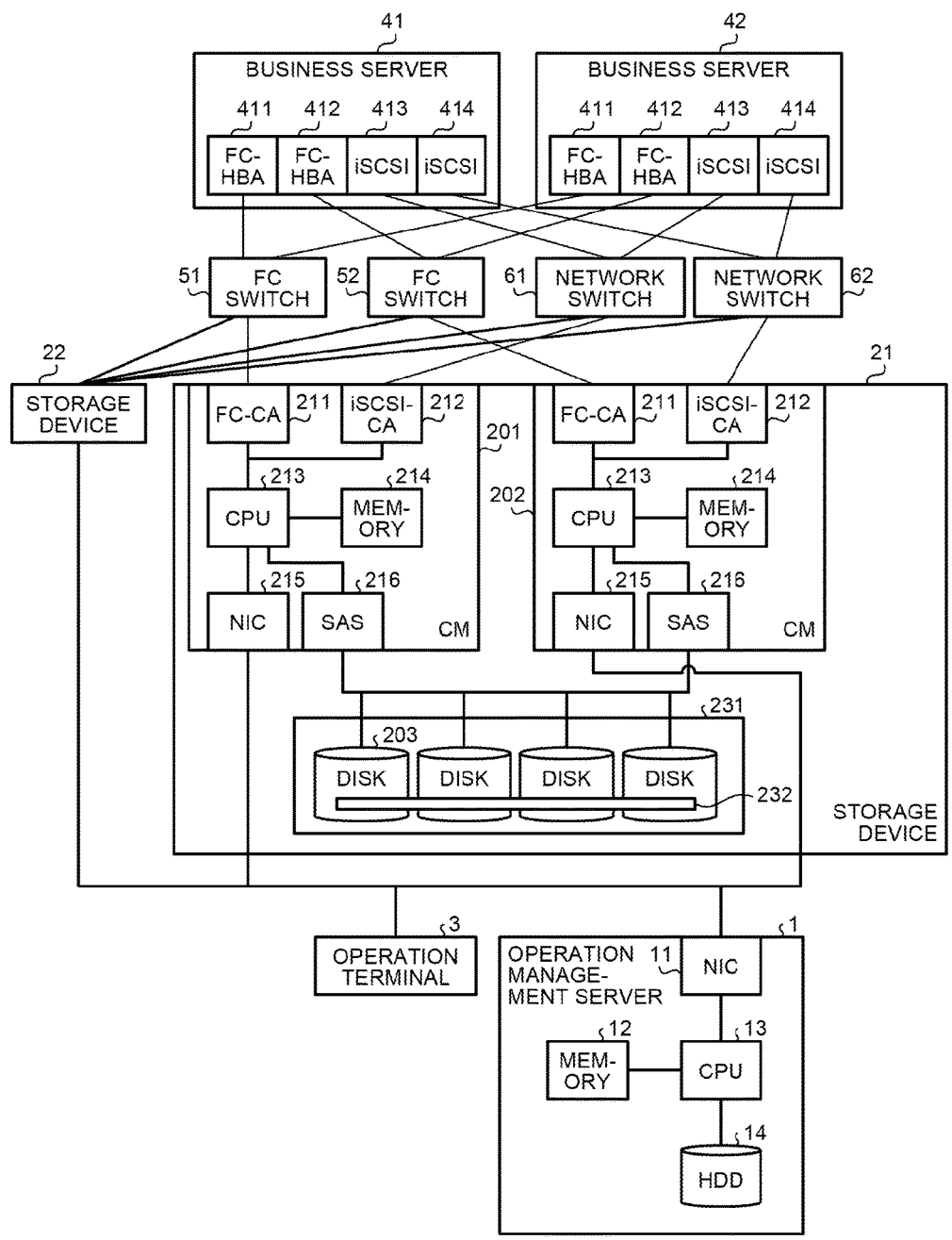
FIG. 2 is a hardware configuration diagram of the storage system.

FIG. 2 is a hardware configuration diagram of the storage system. FIG. 2 illustrates a condition that, as the storage device 2, storage devices 21 and 22 are provided. Further, it also illustrates a condition that, as the business server 4, business servers 41 and 42 are provided.

The business server 4 includes Fiber Channel-Host Bus Adapters (FC-HBA) 411 and 412, and Internet Small Computer System Interfaces (iSCSI) 413 and 414. Here, in the present embodiment, two of the FC-HBAs 411 and 412 are described; however, any number of FC-HBAs may be mounted in the business server 4. Further, two of the iSCSIs 413 and 414 are described; however, any number of iSCSIs may be mounted in the business server 4.

The FC-HBAs 411 and 412 are communication interfaces for data communication using a fibre channel. The FC-HBAs 411 and 412 are respectively connected to FC switches 51 and 52.

The iSCSIs 413 and 414 are communication interfaces for data communication compliant with iSCSI standard. The iSCSIs 413 and 414 are respectively connected to network switches 61 and 62.

The FC switches 51 and 52 relay communication using a fibre channel between the storage device 2 and the business server 4. The FC switches 51 and 52 connect the FC-HBAs 411 and 412 to a FC-CA (Channel Adapter) 211.

The network switches 61 and 62 relay communication using iSCSI between the storage device 2 and the business server 4. The network switches 61 and 62 connect the iSCSIs 413 and 414 to an iSCSI-CA 212.

The storage device 2 includes Controller Modules (CM) 201 and 202 and a disk 203.

The CMs 201 and 202 have the same features. Thus, the CM 201 will be explained as an example.

The CM 201 includes the FC-CA 211, the iSCSI-CA 212, a central processing unit (CPU) 213, a memory 214, a Network Interface Card (NIC) 215 and a Serial Attached SCSI (SAS) 216.

The FC-CA 211, the iSCSI-CA 212, the memory 214, the NIC 215 and the SAS 216 are connected to the CPU 213.

The CPU 213 executes data transmission and reception to and from the business server 4 via the FC-CA 211 and the iSCSI-CA 212.

Further, the CPU 213 reads and writes data from and to the disk 203 via the SAS 216.

Further, the CPU 213 communicates with the operation terminal 3 and the operation management server 1 via the NIC 215. For example, upon receiving an instruction to tune a later described bandwidth from the operation management server 1, the CPU 213 tunes the bandwidth of the disk 203 according to the instruction.

In the storage device 2, a plurality of disks 203 are mounted. In FIG. 2, the plurality of disks 203 compose a RAID group 231. Here, the disk 203 is not limited to the embodiment and there is a case that the disk 203 does not compose a RAID group. Further, a memory region of the RAID group 231 is allocated to a memory region of a volume 232. The volume 232 is a logical volume.

Here, writing and reading data by the CPU 213 will be explained. The CPU 213 receives a read command which is an order to read data and a write command which is an order to write data from a business application running on the business server 4. In this case, the read command and the write command are transmitted to the CPU 213 via a port of the FC switch 51 and a port of the FC-CA 211, for example. Then, according to a received command, the CPU 213 writes or reads data to or from the volume 232 of the disk 203. In this case, the data is written and read to and from the volume 232 according to the structure of the RAID group 231. Although a case in which the CPU 213 of the CM 201 executes a process of reading and writing data has been explained here, the CPU 213 of the CM 202 also executes the same process.

In other words, in data transfer such as writing and reading data, competition occurs in a port of the FC switch 51, ports of the FC-CA 211 and the iSCSI-CA 212, the CPU 213 as a processor for executing data process, and the RAID group 231. Hereinafter, the port of the FC switch 51, the ports of the FC-CA 211 and the iSCSI-CA 212, the CPU 213 as a processor for processing data, and the RAID group 231 are sometimes referred to as a "resource" as a whole. The resource in which competition occurs is assumed as an example of a "transmission resource."

When competition occurs in each resource during data transfer, performance of data transfer is deteriorated. Thus, in a transmission path using the resource in which competition occurs, by tuning a bandwidth of the volume 232 using the transmission path, competition in the resource can be solved and performance of the data transfer can be maintained high. Next, bandwidth tuning of the volume 232 will be explained.

The operation management server 1 includes an NIC 11, a memory 12, a CPU 13 and a Hard Disk Drive (HDD) 14. The NIC 11, the memory 12 and the HDD 14 are connected to the CPU 13 via a bus.

Figure 3:
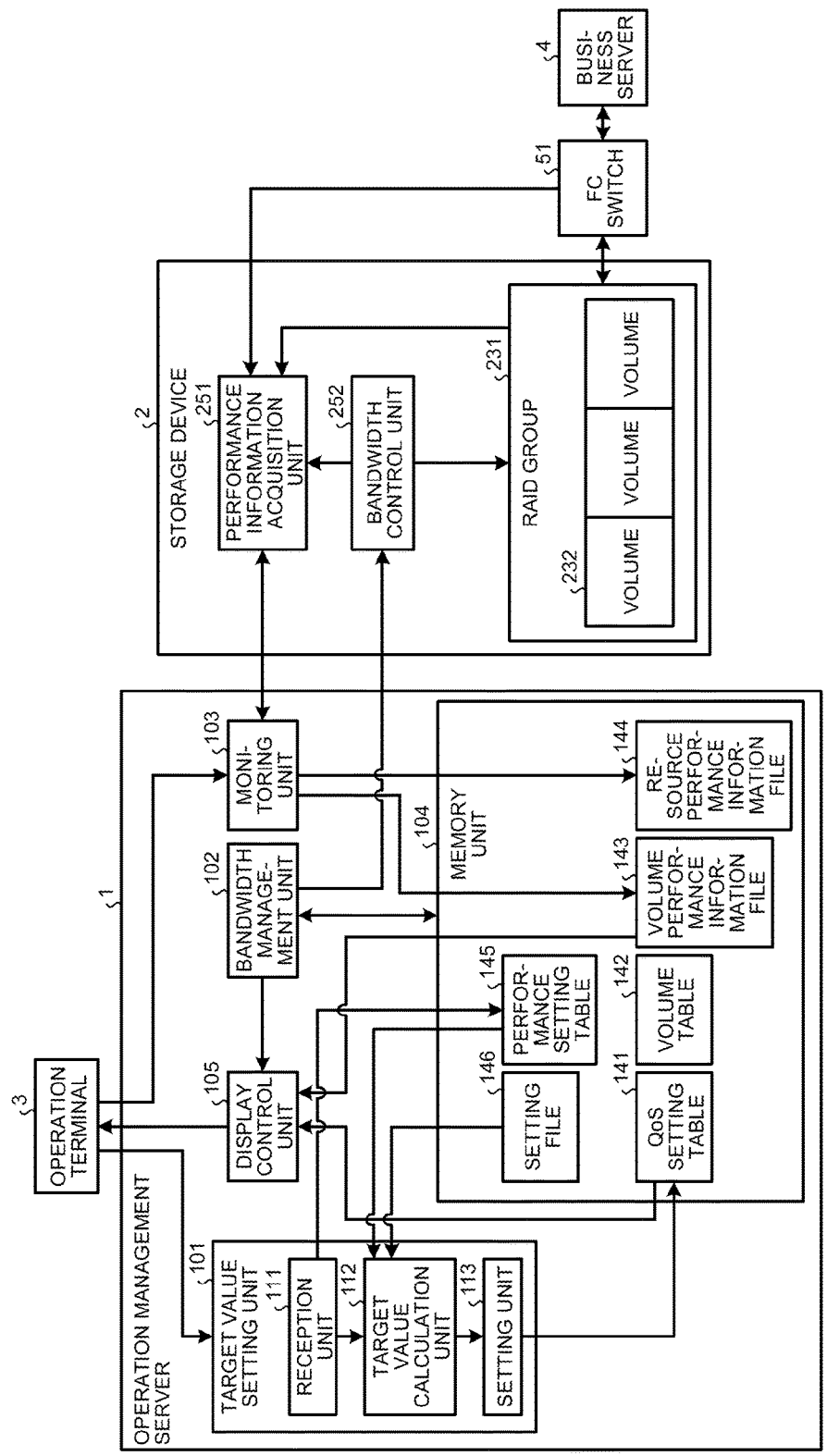
FIG. 3 is a block diagram of an operation management server and a storage device according to the first embodiment.

FIG. 3 is a block diagram of the operation management server and the storage device according to the first embodiment. The operation management server 1 includes a target value setting unit 101, a bandwidth management unit 102, a monitoring unit 103, a memory unit 104 and the display control unit 105. Further, the storage device 2 includes a performance information acquisition unit 251 and a bandwidth control unit 252.

The memory unit 104 includes predetermined information memory regions respectively stores a QoS setting table 141, a volume table 142, a volume performance information file 143, a resource performance information file 144, a performance setting table 145 and a setting file 146. Here, the information memory regions do not have to store each table itself and may store information which can be arranged as a table when controlling. A function of the memory unit 104 is realized in the HDD 14 of FIG. 2, for example.

Figure 4:
FIG. 4 is a diagram of an example of a QoS setting table.

FIG. 4 is a diagram of an example of the QoS setting table. The volume identification information is information that uniquely identifies the volumes 232. In this embodiment, in the Qos setting table 141, volume identification information, target response times, and bandwidths are associated and registered.

In the present embodiment, the volume identification information is represented by storage device numbers and volume numbers. For example, the storage device 21 of FIG. 2 is represented as "No. 1," the storage device 22 is represented as "No. 2," and "Storage=1, VolNo=1" represents the volume 232 of which volume number is "No. 1" in the storage device 21.

Further, the target response time is a response time that is a target for the volume having a corresponding volume identification information. When the target response time is not set, a reference representing a blank is described in the field of the target response time.

Further, the bandwidth is a bandwidth set in the volume having corresponding volume identification information. In FIG. 4, the bandwidth is expressed by two types of data, which are a data amount per second (MB Per Second) which represents a throughput and a read/write number (IOPS: Input Output Per Second).

The volume table 142 represents the resources used by the respective volumes 232. In other words, the volume 232 indicated by the volume identification information uses the processor, the port number, the switch port, and the RAID group which are associated in the volume table 142.

Since transmission paths used by the respective volumes 232 are determined in advance, the used resource which is provided along the transmission path can be identified in advance. Thus, in the volume table 142, resources corresponding to the respective volumes are previously registered.

In the volume performance information file 143, information representing actually measured performance of the respective volumes 232 is registered. In the present embodiment, in the volume performance information file 143, in addition to the measurement dates and times when the measurements are executed, volume identification information, measured response times, measured throughputs, measured IOPS, measured cache hit ratios, and measured delay times are associated and registered. In the following, the volume identification information, the measured response time, the measured throughput, the measured IOPS, the measured cache hit ratio, and the measured delay time may sometimes be referred to as "volume performance information" as a whole.

The measured response time is a response time which is measured when data is written or read to or from the volume 232 which has the corresponding volume identification information. The measured throughput is a throughput which is measured when data is written or read to or from the volume 232 which has the corresponding volume identification information. The measured IOPS is IOPS measured when data is written or read to or from the volume 232 which has corresponding volume identification information. The measured cache hit ratio is a cache hit ratio which is measured when data is written or read to or from the volume 232 which has the corresponding volume identification information. The measured delay time is a delay time which is measured when data is written or read to or from the volume 232 which has the corresponding volume identification information.

The resource performance information file 144 represents actual performance of the respective resources. According to the present embodiment, in the resource performance information file 144, in addition to performance measurement dates and times when the measurements are executed, resource types, resource identification information and busy ratios are associated and registered.

The resource identification information is information that uniquely identifies the respective resources. The resource type represents a type of a resource which is identified by resource identification information. The busy ratio is a load factor of the resource identified by the resource identification information.

Figure 5:
FIG. 5 is a diagram of an example of a performance setting table.

FIG. 5 is a diagram of an example of the performance setting table. The performance setting table 145 is a table for storing performance levels representing target performance of the respective volumes 232 designated by an operator. Here, the performance level designated by the operator is information of performance of each volume 232 indicated by classified into a predetermined levels. Further, the performance level is a tuning target of bandwidth tuning of the volume 232 by the bandwidth management unit 102. In the present embodiment, the performance level is classified into high performance, middle performance, and low performance. The performance setting table 145 stores designated performance levels of the respective volumes 232 by associating with the identification information of the respective volumes 232. Here, among the volumes 232, some volumes do not have designated performance level and information of performance levels is not stored in the fields corresponding to those volumes 232.

Figure 6:
FIG. 6 is a diagram of an example of a setting file according to the first embodiment.

FIG. 6 is a diagram of an example of the setting file according to the first embodiment. The setting file 146 is a file that stores parameters to calculate target values of the performance of the volumes 232. In the setting file 146, parameters of the respective target levels are stored. In the present embodiment, a target response time per an input/output (IO) unit size at a cache hit and a target response time per an I/O unit size at a cache miss are stored for each performance level in the setting file 146.

When the IO size is large, the response time becomes long. Without tuning the target value using the IO size, when a measurement result with a large IO size is used, the response time becomes long and a large bandwidth is maintained even if the target performance is "low performance." On the other hand, when a measurement result with a small IO size is used, the response time is measured short and only a small bandwidth is maintained even if the performance level is "high performance." Further, the response times differ at a cache hit and at a cache miss. Accordingly, without tuning the target value using the cache hit ratio, when a measurement result with a high cache hit ratio is used, the response time is measured short and only a small bandwidth is maintained even if the performance level is "high performance." Thus, as illustrated in the setting file 146, as a parameter for calculating a target value, an IO size and a cache hit ratio are used.

Figure 7A:
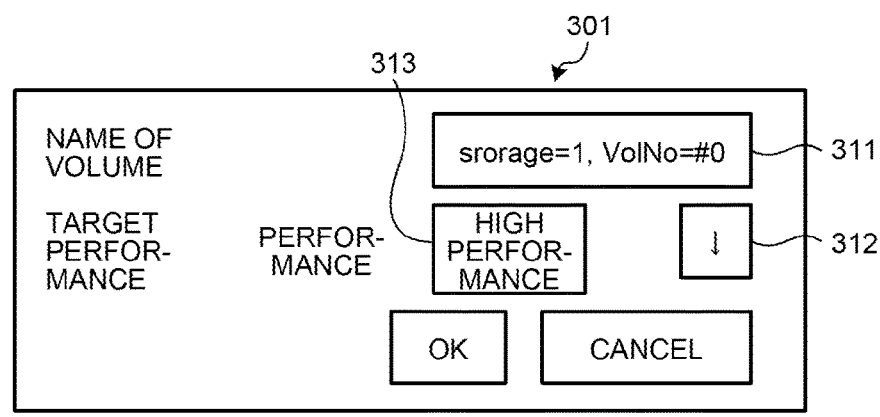
FIG. 7A is a diagram of an example of a target performance input screen.
Figure 7B:
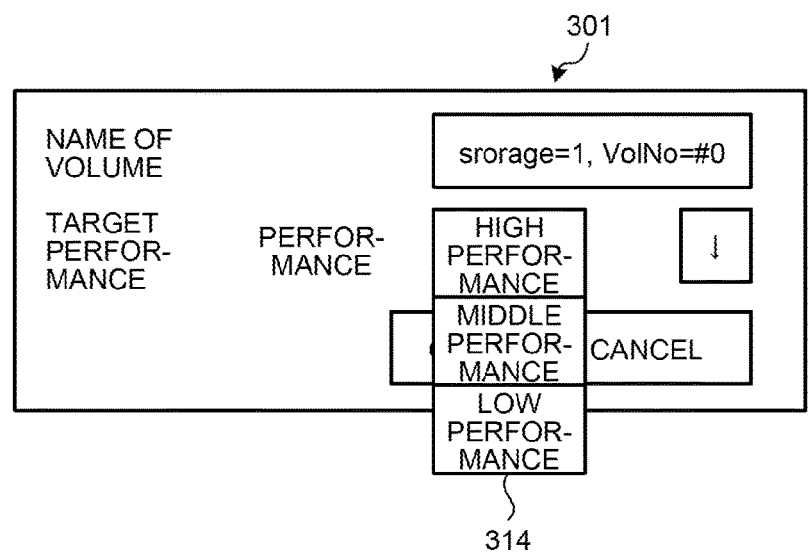
FIG. 7B is a diagram of an example of the target performance input screen when a target performance is selected.

Referring back to FIG. 3, the further explanation is given. The display control unit 105 receives a request for a target value setting from the operation terminal 3. The display control unit 105 stores types of the performance levels. Then, the display control unit 105 controls the monitor of the operation terminal 3 to display a target performance input screen 301 illustrated in FIG. 7A. With this, on the monitor of the operation terminal 3, the target performance input screen 301 is displayed. FIG. 7A is a diagram of an example of the target performance input screen. Further, FIG. 7B is a diagram of an example of the target performance input screen when a target performance is being selected.

The target performance input screen 301 includes a volume name input field 311, a button 312, and a target performance display field 313. The button 312 is a list display button for selectably displaying a list of target performance.

By using an input device such as a keyboard, the operator inputs volume identification information of the volume 232 for which the performance level is set in the volume name input field 311.

Further, when the operator selects the button 312 by using an input device such as a mouse, the display control unit 105 receives a notification of the selection of the button 312 from the operation terminal 3. Then, the display control unit 105 displays a performance level list 314 on the monitor of the operation terminal 3 as illustrated in FIG. 7B. Then, the operator selects a performance level to set to the volume 232 designated from the performance level list 314 by using the input device such as a mouse. For example, when "high performance" is selected as the performance level, "high performance" is displayed in the target performance display field 313 as illustrated in FIG. 7A. After completing the input of the identification information of the volume 232 to which the performance level is set and the input to designate the target level, the operator selects an OK button. With this, input information is transmitted to a reception unit 111.

Further, the display control unit 105 acquires a target response time from the QoS setting table 141 and controls the monitor or the like of the operation terminal 3 to display the acquired target response time. Further, the display control unit 105 acquires a measured response time from the volume performance information file 143 and controls the monitor or the like of the operation terminal 3 to display the acquired measured response time.

The target value setting unit 101 includes the reception unit 111, a target value calculation unit 112, and a setting unit 113.

The reception unit 111 receives the performance level of the volume 232, which is input by the operator, from the operation terminal 3. The reception unit 111 registers the target response time of the designated volume 232 to the performance setting table 145. Then, the reception unit 111 instructs the target value calculation unit 112 to calculate a target value. In the following, the volume 232 to which a target performance (here, a performance level) is set is referred to as a "target-set volume." Further, the volume to which a target performance is not set is referred to as a "non-target-set volume."

The target value calculation unit 112 receives, from the reception unit 111, an instruction to calculate a target value.

Then, the target value calculation unit 112 acquires a performance level for each target-set volume 232 from the performance setting table 145. Further, the target value calculation unit 112 acquires, from the setting file 146, a target response time per IO unit size at a cache hit and a target response time per IO unit size at a cache miss, which are corresponding to the acquired performance level.

The target value calculation unit 112 calculates a target response time using the following Equation (1).

$$\begin{aligned} \text{target response time} = & \{\text{cache hit ratio} \times \text{target response time per } IO \text{ unit} \\ & \text{size at cache hit} + (1 - \text{cache hit ratio}) \times \text{target} \\ & \text{response time per } IO \text{ unit size at cache miss}\} \times \\ & (\text{measured throughput} \div \text{measured } IOPS) \end{aligned} \qquad (1)$$

Here, the term written in curly brackets in Equation (1) expresses an average response time per IO unit size. Further, the term following the curly brackets indicates a measured value of the IO size for one piece of data. In other words, the target value calculation unit 112 can obtain a target response time in a single data transmission or reception by using Equation (1).

Then, the target value calculation unit 112 transmits the calculated target response time of each target-set volume to the setting unit 113.

The setting unit 113 receives the target response time of each target-set volume from the target value calculation unit 112. Then, the setting unit 113 registers the target response time of each target-set volume to the QoS setting table 141.

The monitoring unit 103 receives an instruction to start performance collection from the operator via the operation terminal 3. After that, the monitoring unit 103 starts to regularly receive performance information of the volumes and resources from the performance information acquisition unit 251. Then, the monitoring unit 103 writes the received performance information of each volume 232 to the volume performance information file 143. Further, the monitoring unit 103 writes the received performance information of the resources to the resource performance information file 144.

The bandwidth management unit 102 identifies a target-set volume from the QoS setting table 141.

The bandwidth management unit 102 selects one of the target-set volumes. In the following, this selection of the target-set volume is referred to as a "first selection." Next, the bandwidth management unit 102 acquires information of a resource that the target-set volume selected in the first selection uses from the volume table 142. Further, the bandwidth management unit 102 acquires busy ratios of the respective acquired resources from the resource performance information file 144. Then, the bandwidth management unit 102 identifies a resource which has the highest busy ratio from the resources that the target-set volume selected in the first selection uses.

Using the volume table 142, the bandwidth management unit 102 identifies the volume 232 which shares the resource having the highest busy ratio from the resources that the target-set volume selected in the first selection uses. This identified volume 232 is referred to as a "shared volume."

The bandwidth management unit 102 selects one target-set volume from shared volumes. In the following, this selection of the target-set volume is referred to as a "second selection." Then, the bandwidth management unit 102 acquires, from the volume performance information file 143, a measured response time of the target-set volume selected in the second selection. Further, the bandwidth management unit 102 acquires a target response time of the target-set volume selected in the second selection from the QoS setting table 141. Then, the bandwidth management unit 102 compares the measured response time of the target-set volume selected in the second selection with the target response time thereof.

When the target response time is shorter than the measured response time, the bandwidth management unit 102 reserves bandwidth expansion of the target-set volume selected in the second selection. Further, the bandwidth management unit 102 reserves bandwidth reduction of the non-target-set volumes among the shared volumes.

In contrast, when the target response time is longer than the measured response time, the bandwidth management unit 102 reserves bandwidth reduction of the target-set volume selected in the second selection. Further, the bandwidth management unit 102 reserves bandwidth expansion of the non-target-set volumes among the shared volumes.

The bandwidth management unit 102 executes the second selection of a target-set volume from the shared volumes and the reservation of bandwidth tuning for all setting volumes included in the shared volumes.

Further, the bandwidth management unit 102 executes the first selection for all of the target-set volumes, the subsequent identification of the shared volumes, the second selection, and the reservation of bandwidth tuning.

Then, the bandwidth management unit 102 determines bandwidth tuning of each volume 232 based on the reservation of tuning executed for each volume 232. For example, assuming an initial value as "0," the bandwidth management unit 102 obtains a sum of tuning of the respective volumes 232 by adding "1" in a case of an expansion reservation and subtracting "1" in a case of a reduction reservation. Then, when the sum result is a positive value, the bandwidth management unit 102 determines expansion of the bandwidth of the volume 232. On the other hand, when the sum result is a negative value, the bandwidth management unit 102 determines reduction of the bandwidth of the volume 232.

After that, the bandwidth management unit 102 notifies the determined tuning of the bandwidth of each volume 232 to the bandwidth control unit 252. Concretely, the bandwidth management unit 102 transmits a setting command for expanding or reducing the bandwidth of each volume 232 to the storage device 2.

The functions of the target value setting unit 101, the bandwidth management unit 102, and the monitoring unit 103 are realized for example by the CPU 13 and the memory 12 of FIG. 2. For example, the HDD 14 stores various programs for realizing the functions of the target value setting unit 101, the bandwidth management unit 102, and the monitoring unit 103. Then, the CPU 13 reads various programs from the HDD 14 and develops a process for realizing the functions of the target value setting unit 101, the bandwidth management unit 102, and the monitoring unit 103 on the memory 12 to execute.

The performance information acquisition unit 251 receives an instruction to start performance collection from the monitoring unit 103. Then, the performance information acquisition unit 251 regularly acquires performance information of each volume 232 and transmits the information to the monitoring unit 103. Further, the performance information acquisition unit 251 regularly acquires performance information of each resource and transmits the information to the monitoring unit 103. Here, as an example of the resource performance information acquisition, FIG. 3 illustrates acquisition of performance information by the performance information acquisition unit 251 from the RAID group 231 and the FC switch 51.

The bandwidth control unit 252 receives a setting command for expansion or reduction of a bandwidth from the bandwidth management unit 102. Then, the bandwidth control unit 252 expands or reduces the bandwidth of the volume 232 designated by each setting command, according to the designation of the setting command.

Figure 8:
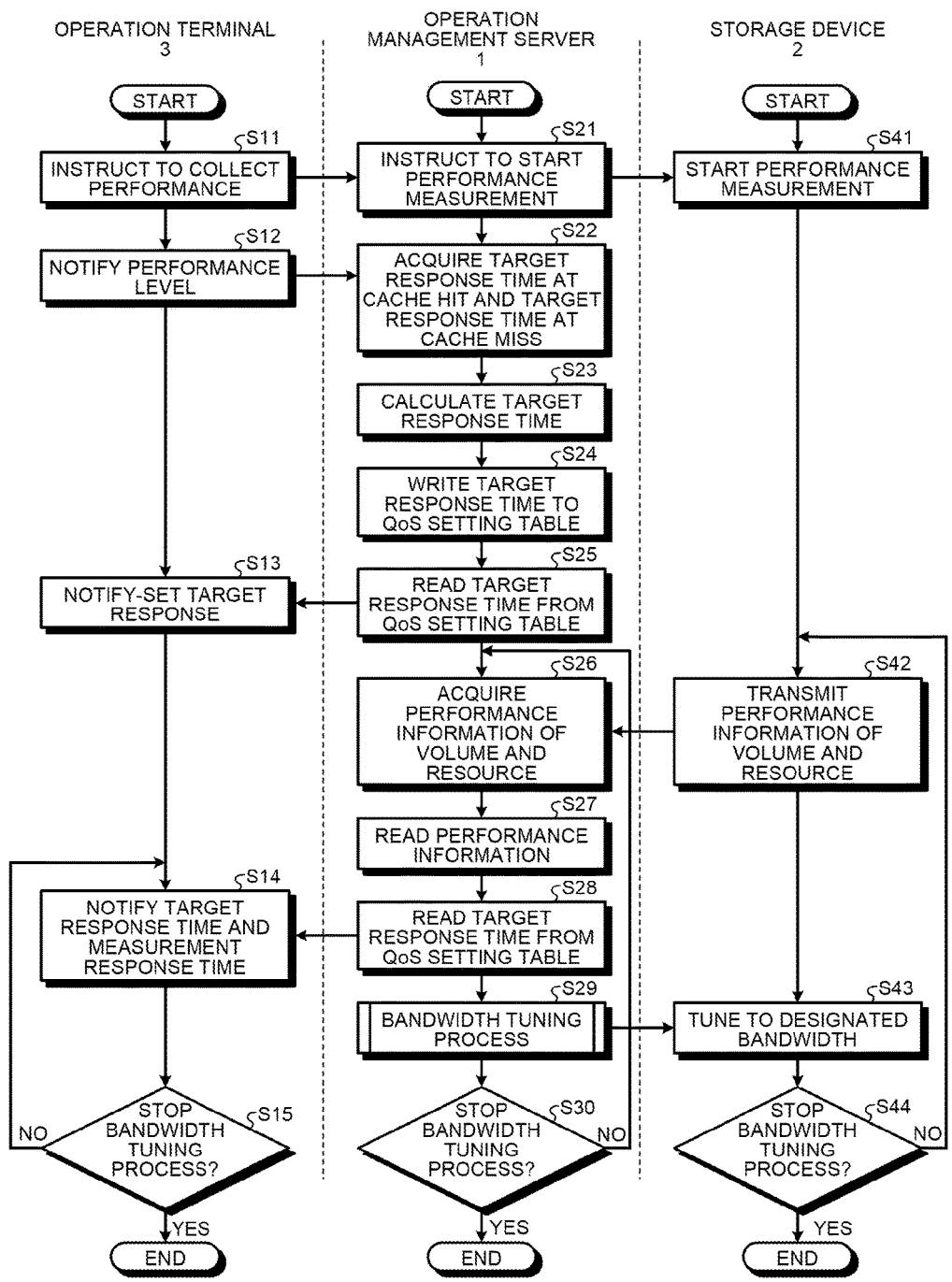
FIG. 8 is a flowchart of a bandwidth control in the storage system according to the first embodiment.

Next, referring to FIG. 8, a flow of a bandwidth control in the storage system according to the present embodiment will be explained. FIG. 8 is a flowchart of a bandwidth control in the storage system according to the first embodiment. In FIG. 8, the left flow illustrates a process in the operation terminal 3. The center flow illustrates a process in the operation management server 1. The right flow illustrates a process in the storage device 2. Further, the arrows connecting the respective flows indicate that an order or data is transmitted in the direction of the arrow.

The operation terminal 3 receives an instruction from the operator and instructs the monitoring unit 103 of the operation management server 1 to collect performance (step S11).

Further, the operation terminal 3 receives an instruction from the operator using the target value input screen and notifies the performance level to the target value setting unit 101 of the operation management server 1 (step S12).

After that, the operation terminal 3 receives information of a set target response time from the display control unit 105. Then, the operation terminal 3 notifies the set target response time to the operator by displaying on the monitor or the like (step S13). The operator confirms the set target response time based on the notification.

After that, the operation terminal 3 receives a target response time and a measured response time from the display control unit 105 of the operation management server 1. Then, the operation terminal 3 notifies the target response time and the measured response time to the operator by displaying on the monitor or the like (step S14). The operator confirms a difference of the target response time and the measured response time based on the notification.

After that, the operation terminal 3 judges whether or not to stop the bandwidth tuning process (step S15). For example, the operation terminal 3 judges to stop the bandwidth tuning process when an instruction to stop the bandwidth tuning process is received from the operator.

When it is judged not to stop the bandwidth tuning process (step S15: No), the process of the operation terminal 3 returns to step S14. On the other hand, when it is judged to stop the bandwidth tuning process (step S15: Yes), the operation terminal 3 ends the bandwidth tuning.

Next, a process of the operation management server 1 will be explained. The monitoring unit 103 receives an instruction to start performance measurement from the operation terminal 3. Then, the monitoring unit 103 instructs the performance information acquisition unit 251 of the storage device 2 to start performance measurement (step S21).

The reception unit 111 receives a performance level from the operation terminal 3. Then, the reception unit 111 writes the received performance level to the performance setting table 145. Next, the target value calculation unit 112 reads the performance level of each target-set volume from the performance setting table 145. Further, the target value calculation unit 112 acquires a target response time per IO unit size at a cache hit and a target response time per IO unit size at a cache miss for each performance level (step S22).

Then, the target value calculation unit 112 calculates the target response time of each target-set volume using Equation (1) (step S23).

Then, the target value calculation unit 112 writes the calculated target response time of each target-set volume to the QoS setting table 141 (step S24).

After that, the display control unit 105 reads the target response time of each target-set volume from the QoS setting table 141 and notifies it to the operation terminal 3 (step S25).

The monitoring unit 103 acquires performance information of the volumes and the resources (step S26). Then, the monitoring unit 103 registers the performance information of the volume to the volume performance information file 143 and registers the performance information of the resource to the resource performance information file 144.

The bandwidth management unit 102 reads performance information of the volumes and the resources from the volume performance information file 143 and the resource performance information file 144 (step S27).

The bandwidth management unit 102 and the display control unit 105 read the target response time from the QoS setting table 141 (step S28). Further, the bandwidth management unit 102 and the display control unit 105 acquire the measured response time from the volume performance information file 143. Then, the display control unit 105 transmits the target response time and the measured response time to the operation terminal 3.

Further, the bandwidth management unit 102 executes the bandwidth tuning process (step S29). Details of the bandwidth tuning process will be explained later.

The bandwidth management unit 102 judges whether or not to stop the bandwidth tuning process (step S30). For example, the bandwidth management unit 102 judges to stop the bandwidth tuning process when an instruction to stop the bandwidth tuning process from the operator is received via the operation terminal 3.

When it is judged not to stop the bandwidth tuning process (step S30: No), the process of the bandwidth management unit 102 returns to step S26. On the other hand, when it is judged to stop the bandwidth tuning process (step S30: Yes), the bandwidth management unit 102 ends the bandwidth tuning.

Next, a process of the storage device 2 will be explained. The performance information acquisition unit 251 receives an instruction to start a performance measurement from the monitoring unit 103 of the operation management server 1. Then, the performance information acquisition unit 251 starts to measure performance of each volume 232 and performance of each resource (step S41).

After that, the performance information acquisition unit 251 transmits the acquired performance information of each volume 232 and performance information performance of each resource to the bandwidth management unit 102 of the operation management server 1 (step S42).

After that, upon receiving a setting command from the bandwidth management unit 102 of the operation management server 1, the bandwidth control unit 252 tunes by expanding or reducing the bandwidth of the designated volume 232 to the designated bandwidth (step S43).

The bandwidth control unit 252 judges whether or not to stop the bandwidth tuning process (step S44). For example, the bandwidth control unit 252 judges to stop the bandwidth tuning process when an instruction to stop the bandwidth tuning process from the operator is received via the operation management server 1.

When it is judged not to stop the bandwidth tuning process (step S44: No), the process of the bandwidth control unit 252 returns to step S42. On the other hand, when it is judged to stop the bandwidth tuning process (step S44: Yes), the bandwidth control unit 252 ends the bandwidth tuning.

Figure 9:
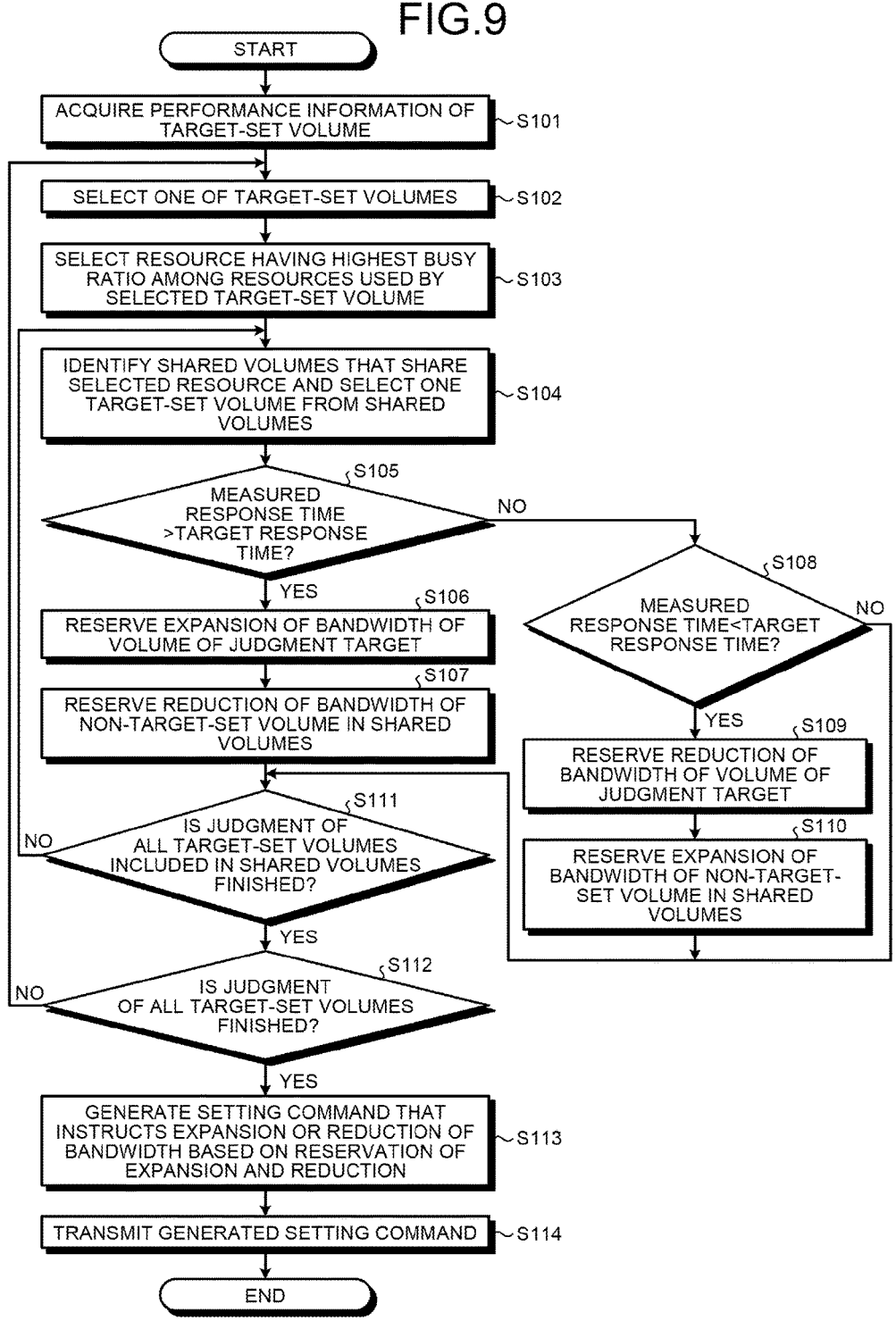
FIG. 9 is a flowchart of a bandwidth tuning of a volume in the operation management server according to the first embodiment.

Next, referring to FIG. 9, a process for tuning the bandwidth of the volume 232 by the operation management server 1 according to the present embodiment will be explained. FIG. 9 is a flowchart of a process for tuning a bandwidth of a volume by the operation management server according to the first embodiment. The flowchart of FIG. 9 illustrates details of the process that the operation management server 1 executes in step S27 of FIG. 8.

The bandwidth management unit 102 acquires performance information of target-set volumes from the volume performance information file 143 (step S101).

The bandwidth management unit 102 selects one of the target-set volumes (step S102).

The bandwidth management unit 102 selects a resource with the highest busy ratio from the resources that the selected target-set volume uses (step S103).

Next, the bandwidth management unit 102 identifies shared volumes which share the selected resource. Further, the bandwidth management unit 102 selects one target-set volume from the shared volumes (step S104).

The bandwidth management unit 102 judges whether or not the target response time of the selected target-set volume is shorter than the measured response time (step S105). When the target response time is shorter than the measured response time (step S105: Yes), the bandwidth management unit 102 reserves expansion of the bandwidth of the target-set volume, which is the target volume to be judged (step S106).

Further, the bandwidth management unit 102 reserves a reduction of the bandwidth of the non-target-set volume among the shared volumes (step S107).

On the other hand, when the target response time is equal to or longer than the measured response time (step S105: No), the bandwidth management unit 102 judges whether or not the target response time of the selected target-set volume is longer than the measured response time (step S108). When the target response time is not longer than the measured response time (step S108: No), the process of the bandwidth management unit 102 proceeds to step S111.

On the other hand, when the target response time is shorter than the measured response time (step S108: Yes), the bandwidth management unit 102 reserves reduction of the bandwidth of the target-set volume, which is the target volume to be judged (step S109).

Further, the bandwidth management unit 102 reserves expansion of the bandwidth of the non-target-set volume among the shared volumes (step S110).

The bandwidth management unit 102 judges whether or not the judgment of all of the target-set volumes included in the shared volumes has finished (step S111). In other words, the bandwidth management unit 102 judges whether the second selection has been executed for all of the target-set volumes included in the shared volumes. When there is a target-set volume to which the judgment has not finished (step S111: No), the process of the bandwidth management unit 102 returns to step S104.

On the other hand, when judgment for all target-set volumes included in the shared volumes has finished (step S111: Yes), the bandwidth management unit 102 judges whether the judgment for all target-set volumes has finished (step S112). In other words, the bandwidth management unit 102 judges whether the first selection has been executed for all target-set volumes. When there is a target-set volume to which the judgment has not finished (step S112: No), the process of the bandwidth management unit 102 returns to step S102.

On the other hand, when judgment for all of the target-set volumes has finished (step S112: Yes), the bandwidth management unit 102 determines expansion or reduction of the bandwidth of each volume 232 based on the reservation of expansion and reduction of each volume 232. Then, the bandwidth management unit 102 generates a setting command that instructs expansion or reduction of the bandwidth of each determined volume 232 (step S113).

After that, the bandwidth management unit 102 transmits the generated setting command to the bandwidth control unit 252 (step S114).

As explained above, in the storage management device according to the present embodiment, a target response time corresponding to the target performance can be dynamically calculated by selecting the level of the target performance. Then, the storage management device automatically tunes a bandwidth of a volume sharing an overloaded resource and keeps a response time of a target-set volume within a target response time. With this, the storage management device according to the present embodiment can easily execute proper performance tuning of the storage system with a bandwidth throttling range.

Modification Example

Further, in the embodiment explained above, bandwidth restriction is executed using a response time as a performance index; however, the performance index can be other values with which performance of a transmission path to each volume can be evaluated. For example, as a performance index, an IOPS or a throughput may be employed. Here, an IOPS and a throughput have a magnitude relation which is opposite to that of the response time. In other words, the response time becomes smaller as the performance becomes higher; however, the values of the IOPS and the throughput become larger as the performance becomes higher. Thus, when expansion and reduction of a bandwidth is judged using the IOPS or the throughput as a performance index, the bandwidth management unit 102 evaluates the condition to judge expansion and reduction of a band as opposite to the case of the response time.

Concretely, for example, a case that an IOPS is used as the performance index will be explained. When a target IOPS is larger than the measured IOPS, the bandwidth management unit 102 reserves expansion of the target-set volume. On the other hand, when the target IOPS is smaller than the measured IOPS, the bandwidth management unit 102 reserves reduction of the target-set volume.

Further, different performance indexes may be used for each target performance. For example, a response time may be used for bandwidth tuning when high performance is designated, an IOPS may be used for bandwidth tuning when middle performance is designated, and a throughput may be used for bandwidth tuning when low performance is designated. As described above, when a different parameter is used as a performance index for each target performance, the setting file 146 may be composed as illustrated in FIG. 10. FIG. 10 is a diagram of an example of a setting file of a case that a different performance index is used for each performance level. Then, the target value calculation unit 112 calculates a target value using a different performance index for each target performance. Further, the bandwidth management unit 102 judges expansion or reduction of a bandwidth using a different performance index for each target performance.

Further, different performance indexes may be used according to types of the application which uses each volume 232. For example, in interactive business, the response time is preferably used as a performance index. Further, in business which mainly handles random accesses of a database or the like, an IOPS is preferably used as a performance index. Further, in business which mainly handles sequential accesses such as backuping or restoring, a throughput is preferably used as a performance index.

In this manner, when the different performance index is used for each application, the setting file 146 may be composed as illustrated in FIG. 11. FIG. 11 is a diagram of an example of a setting file of a case that a different performance index is used for each application. The reception unit 111 receives information of an application being executed from the operator. Then, the target value calculation unit 112 acquires the information of the application from the reception unit 111 and acquires a target value of target performance corresponding to the application from the setting file 146 illustrated in FIG. 11. Further, the target value calculation unit 112 calculates a target value using a different performance index for each application. Then, the bandwidth management unit 102 notifies, to the bandwidth control unit 252, the bandwidth tuning using a different performance index for each application.

As explained above, since different performance indexes are used according to the target, more preferable bandwidth tuning can be performed.

Second Embodiment

Next, a second embodiment will be explained. In an operation management server according to the present embodiment, a method for calculating a target value is switched to obtain a preferable value which is more suitable to an actual operation, compared to the target value of the first embodiment. Thus, in the following explanation, the calculation of a target value will be mainly explained. An operation management server according to the present embodiment is also illustrated by the block diagram of FIG. 2. In the following explanation, functions same as the respective functions explained in the first embodiment will be omitted. In the present embodiment, a case in which a response time is used as a performance index will be explained.

Firstly, the setting file 146 according to the present embodiment will be explained. FIG. 12 is a diagram of an example of a setting file according to the second embodiment. The response time is divided into a time that is proportional to the IO size such as a read/write time and a data transfer time, and a time that is not proportional to the IO size such as a disk seek time, a processing time in a processor and a waiting time. The time proportional to the IO size is preferably calculated according to the IO size. On the other hand, the time that is not proportional to the IO size can be obtained as a fixed value in advance.

Thus, in the present embodiment, as a parameter to calculate a target response time, a proportionality factor to obtain the time proportional to the IO size of the target response time and a constant number of the time that is not proportional to the IO size are registered in the setting file 146.

Concretely, as illustrated in FIG. 12, in the setting file 146 of the present embodiment, proportionality factors and fixed times are registered as a target response time calculation parameter per IO unit size at a cache hit. Further, regarding the target response time per IO unit size at a cache miss, proportionality factors and fixed times are registered. In the following, the proportionality factor at a cache hit as a target response time calculation parameter per IO unit size registered in the setting file 146 is referred to as a "proportionality factor at a cache hit." Further, the fixed time at a cache hit as a target response time calculation parameter per IO unit size registered in the setting file 146 is referred to as a "fixed time at a cache hit." Further, the proportionality factor at a cache miss as a target response time calculation parameter per IO unit size registered in the setting file 146 is referred to as a "proportionality factor at a cache miss." In addition, the fixed time at a cache miss as a target response time calculation parameter per IO unit size registered in the setting file 146 is referred to as a "fixed time at a cache miss."

The target value calculation unit 112 acquires a performance level of each target-set volume from the performance setting table 145. Then, the target value calculation unit 112 acquires a proportionality factor at a cache hit, a fixed time at a cache hit, a proportionality factor at a cache miss, and a fixed time at a cache miss corresponding to the acquired performance level of each target-set volume from the setting file 146.

Next, the target value calculation unit 112 calculates the target response time using the following Equation (2).

$$\text{target response time} = Rcache \times \{tcache \times (T \div I) + Ccache\} + \\ (1 - Rcache) \times \{tncache \times (T - I) + Cncache\} \quad (2)$$

$Rcache$: cache hit ratio $tchache$: proportionality factor per IO unit size of target response time at cache hit $Ccache$: constant number of target response time at cache hit $tncache$: proportionality factor per IO unit size of target response time at cache miss $Cncache$: constant number of target response time at cache miss $T$: measured throughput $I$: measured IOPS Then, the target value calculation unit 112 stores the calculated target response time to the QoS setting table 141.

As explained above, in the storage management device according to the present embodiment, the calculation of the target response time is executed as dividing the response time into the time proportional to the IO size and the time unproportional to the IO size. With this, the storage management device can calculate a proper value, as a target value, which is suitable to the actual operation. In other words, the storage management device can properly execute the bandwidth tuning suitable to the actual operation.

Further, in the present embodiment, the equation for calculating the target response time is expressed as a primary expression of a time proportional to the IO size and a fixed time unproportional to the IO size; however, the equation is not limited to this expression. For example, a higher order expression which represents a physics model which accurately expresses an actual operation may be employed. With this, a calculation equation that further accurately expresses the actual operation can be used and the storage management device can further properly execute the bandwidth tuning suitable to the actual operation.

Third Embodiment

Next, a third embodiment will be explained. In an operation management server according to the present embodiment, parameters for calculating a target value are changed according to the type of disks. Here, in the following explanation, the target value calculation will be mainly explained. The operation management server according to the present embodiment can also be illustrated by the block diagram of FIG. 2. In the following explanation, a case in which a function is newly added to the second embodiment will be explained. Then, in the following explanation, functions same as the functions of each unit explained in the first and second embodiments will be omitted. The present embodiment will be explained using a case that a response time is used as the performance index.

Firstly, the setting file 146 according to the present embodiment will be explained. FIG. 13 is a diagram of an example of a setting file according to the third embodiment. The data processing performance at a cache miss differs depending on the performance of the disk. Concretely, the data processing speed is faster in a high speed rotating disk such as an online storage than in a low speed rotating disk such as a near-online (nearline) storage. Further, a solid state drive (SSD) is much faster than the high speed rotating disk such as an online storage. Thus, it is preferable to calculate a target response time according to the type of the disk allocated to the volume 232.

Here, in the present embodiment, the proportionality factor and the fixed time at a cache miss are set according to the disk type as illustrated in FIG. 13. In the present embodiment, explanation will be given using an SSD, an online storage and a nearline storage as the disk types.

The target value calculation unit 112 acquires information of the disk type of each volume 232 in advance. Here, the target value calculation unit 112 acquires the disk type of each volume 232 from a configuration information file stored in the storage device 2, for example.

The target value calculation unit 112 acquires the performance level of each target-set volume from the performance setting table 145. Then, the target value calculation unit 112 acquires the acquired performance level of each target-set volume, a proportionality factor at a cache hit, and a time constant number at a cache hit. Further, the target value calculation unit 112 acquires a proportionality factor at a cache miss and a time constant number at a cache miss corresponding to the disk type from the setting file 146.

Next, the target value calculation unit 112 calculates a target response time by applying the obtained parameters to the above described Equation (2).

Figure 14:
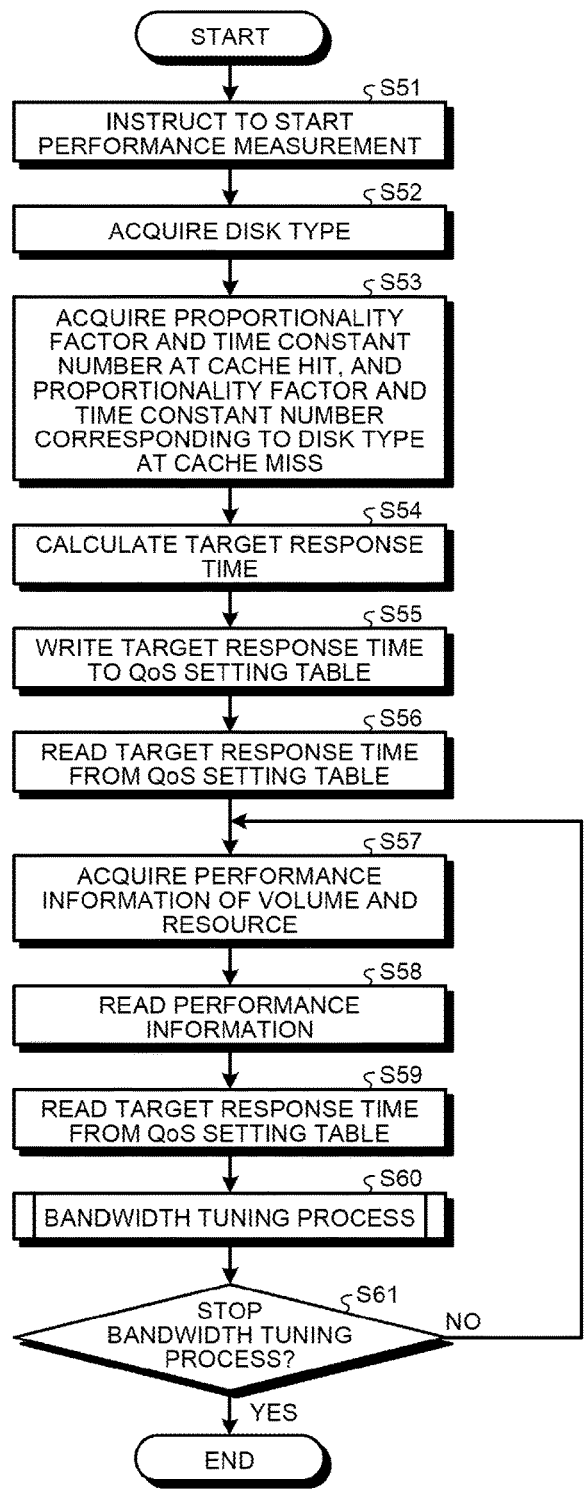
FIG. 14 is a flowchart of a bandwidth tuning process in an operation management server according to the third embodiment.

Next, referring to FIG. 14, a process in the operation management server 1 will be explained. FIG. 14 is a flowchart of a bandwidth tuning process in the operation management server according to the third embodiment. Here, FIG. 14 illustrates only a process of the operation management server; however, in parallel to this process, the operation terminal 3 and the storage device 2 execute processes same as those in the flow of FIG. 8.

The monitoring unit 103 receives an instruction to start a performance measurement from the operation terminal 3. Then, the monitoring unit 103 instructs the performance information acquisition unit 251 of the storage device 2 to start a performance measurement (step S51).

The target value calculation unit 112 acquires the disk types of each volume 232 (step S52).

The reception unit 111 receives performance levels from the operation terminal 3. Then, the reception unit 111 writes the received performance levels to the performance setting table 145. Next, the target value calculation unit 112 reads the performance level of each target-set volume from the performance setting table 145. Further, the target value calculation unit 112 acquires a proportionality factor and a time constant number at a cache hit corresponding to the performance level, and a proportionality factor and a time constant number at a cache miss corresponding to the performance level and disk type (step S53).

Then, the target value calculation unit 112 calculates a target response time of each target-set volume based on Equation (2) (step S54).

Then, the target value calculation unit 112 writes the calculated target response time of each target-set volume to the QoS setting table 141 (step S55).

After that, the display control unit 105 reads the target response time of each target-set volume from the QoS setting table 141 and notifies the same to the operation terminal 3 (step S56).

The monitoring unit 103 acquires performance information of the volumes and resources (step S57). Then, the monitoring unit 103 registers the performance information of the volumes to the volume performance information file 143 and registers the performance information of the resources to the resource performance information file 144.

The bandwidth management unit 102 reads the performance information of the volumes and resources from the volume performance information file 143 and the resource performance information file 144 (step S58).

The bandwidth management unit 102 and the display control unit 105 read the target response time from the QoS setting table 141 (step S59). Further, the bandwidth management unit 102 and the display control unit 105 acquire the measured response time from the volume performance information file 143. Then, the display control unit 105 transmits the target response time and the measured response time to the operation terminal 3.

After that, the bandwidth management unit 102 executes the bandwidth tuning process (step S60).

The bandwidth management unit 102 judges whether or not to stop the bandwidth tuning process (step S61). For example, when receiving an instruction from the operator to stop the bandwidth tuning process via the operation terminal 3, the bandwidth management unit 102 judges to stop the bandwidth tuning process.

When it is judged not to stop the bandwidth tuning process (step S61: No), the process of the bandwidth management unit 102 returns to step S57. On the other hand, when it is judged to stop the bandwidth tuning process (step S61: Yes), the bandwidth management unit 102 ends the bandwidth tuning.

As described above, the storage management device according to the present embodiment calculates a target value using a different parameter according to the disk type. With this, the storage management device can calculate a proper value, as a target value, which is suitable to the disk performance of each volume. In other words, the storage management device can properly execute the bandwidth tuning suitable to the actual operation.

Fourth Embodiment

Next, a fourth embodiment will be explained. An operation management server according to the present embodiment is different from the first to third embodiments that disks having different processing ability are included in a single volume 232. The operation management server according to the present embodiment is also illustrated by the block diagram of FIG. 3. Then, in the following explanation, functions same as the functions of each unit explained in the first to third embodiments will be omitted. In the present embodiment, a case that a response time is used as the performance index will be explained.

Firstly, the volume 232 according to the present embodiment includes one or a combination of an SSD which is a high speed disk, an online storage which is a middle speed disk, a nearline storage which is a low speed disk. The combination may include all of the three types or two types. The setting which type of disk is included in the volume 232 is made by the operator. Then, each volume 232 is sectioned for each type of disk.

The performance information acquisition unit 251 acquires the number of access in each section of the each volume 232 within a predetermined period of time. Then, the performance information acquisition unit 251 transits the acquired access number to the monitoring unit 103.

Figures 15, 16:
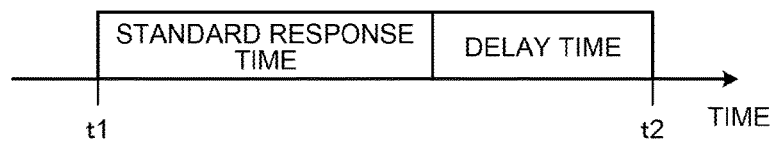
FIG. 15 is a diagram of an example of an access number table.
FIG. 16 is a diagram to explain an actual response time.

The monitoring unit 103 acquires the number of access of each section of each volume 232 within a predetermined period of time from the performance information acquisition unit 251. Then, the monitoring unit 103 stores, to a predetermined information memory region of the memory unit 104, information of an access number table 147 illustrated in FIG. 15 which stores an access number of each section of each volume 232 within a predetermined period of time. FIG. 15 is a diagram of an example of the access number table. Further, the setting file 146 is the same as that in the third embodiment.

The target value calculation unit 112 acquires, from the access number table 147, the number of accesses in each section of a target-set volume within a predetermine period of time. Here, in the present embodiment, the target value calculation unit 112 stores the disk type corresponding to each section number in advance.

The target value calculation unit 112 obtains a cache hit ratio of each disk type of the target-set volume based on the acquired access number. Concretely, the target value calculation unit 112 can calculate a hit ratio by dividing the access number of a section corresponding to each disk type by the total access number of each section. For example, the hit ratio of a high speed disk is obtained by dividing the access number of the section corresponding to the high speed disk by the total access number of each section. Here, as the hit ratio of a disk access of each type, a most recent hit ratio may be used or a hit ratio calculated using an average of plurality hit ratios within a predetermined period of time may be used.

The target value calculation unit 112 acquires the performance level of the target-set volume from the performance setting table 145. Next, the target value calculation unit 112 acquires a proportionality factor and a fixed time of the SSD, online storage, and nearline storage corresponding to the performance level of the target-set volume.

Then, the target value calculation unit 112 calculates a target response time by applying the above described Equation (2) to the following Equation (3). Equation (3) is an equation that expresses the member of {tncache×(T/I)+ Cncache} in Equation (2) using a cache hit ratio of each disk type.

$$tcache \times (T \div I) + Cncache = \qquad (3)$$
$$Rhigh \times \{thigh \times (T \div I) + Chigh\} + Rmiddle \times$$
$$\{tmiddle \times (T \div I) + Cmiddle\} + Rlow \times \{tlow \times (T \div I) + Clow\}$$

Rhigh: hit ratio of high speed disk thigh: proportionality factor per IO unit size of target response time at cache hit for high speed disk Chigh: constant number of target response time at cache hit for high speed disk Rmiddle: proportionality factor per IO unit size of target response time at cache hit for middle speed disk Cmiddle: constant number of target response time at cache hit for middle speed disk Rlow: hit ratio of low speed disk tlow: proportionality factor per IO unit size of target response time at cache hit for low speed disk Clow: constant number of target response time at cache hit for low speed disk Here, that is "Rhigh+Rmiddle+Rlow=1." When there is a disk type which is not included in the target-set volume whose target value is to be calculated, the target value calculation unit 112 calculates the hit ratio of the disk type as zero.

As explained above, in the storage management device according to the present embodiment, when different types of disks are included in a single volume, a target value is calculated using different parameters corresponding to the disk types. With this, the storage management device can calculate a proper value, as a target value, which is suitable to the disk performance of each volume, even when different types of disks are included in a single volume. In other words, the storage management device can properly execute bandwidth tuning suitable to the actual operation even when different types of disks are included in a single volume.

Fifth Embodiment

Next, a fifth embodiment will be explained. The operation management server according to the present embodiment is different from the first to fourth embodiments for that, as a target value, a performance ratio, which is compared with a case that the bandwidth of each volume is not restricted, is used. An operation management server according to the present embodiment is also expressed by the block diagram of FIG. 3. In the following explanation, functions same as the functions of each unit explained in the first to fourth embodiments will be omitted. In the present embodiment, a case that a response time is used as a performance index will be explained.

The bandwidth control unit 252 executes a bandwidth restriction by giving a delay time in the actual process to delay a return of the result to the application. In other words, the value that a delay time per one time IO is added to a response time to which a delay time is not added becomes the actual response time from an issue of IO from the application until a return of IO result to the application. In the following, the response time to which the delay time is not added is referred to as a standard response time. In other words, as illustrated in FIG. 16, the time from t1 to t2 to which a delay time of one time IO is added to the standard response time become the actual response time. FIG. 16 is a diagram explaining the actual response time. In the following, the delay time per one time IO is simply referred to as "delay time."

Then, the performance ratio which is a ratio between the actual response time and a standard response can be calculated by dividing the standard response time with the actual response time as expressed by the following Equation (4).

$$\text{performance ratio} = \text{standard response time}/((\text{delay time per one time IO}) + (\text{standard response time})) \quad (4)$$

For example, regarding the storage device 2, in a case that the standard response time of 1 MB data transfer is 0.1 second, when a delay time of 0.1 second is inserted per one time IO, the performance of the storage device 2 seen from the application changes from 10 MB/s to 5 MB/s and the performance becomes a half. In this case, the performance ratio is ½.

The performance information acquisition unit 251 acquires a delay time of each volume 232 from the bandwidth control unit 252. Then, the performance information acquisition unit 251 transmits the delay time of each volume 232 to the monitoring unit 103.

The monitoring unit 103 acquires a delay time of each volume 232 from the performance information acquisition unit 251. Then, the monitoring unit 103 stores the delay time of each volume 232 to the volume performance information file 143.

In the setting file 146, target performance ratios are registered as being associated with each performance level.

The target value calculation unit 112 acquires a delay time of the target-set volume from the volume performance information file 143.

The target value calculation unit 112 acquires a performance level of the target-set volume from the performance setting table 145. Then, the target value calculation unit 112 acquires a target performance ratio corresponding to the performance level of the acquired target-set volume from the setting file 146.

Then, the target value calculation unit 112 transmits the acquired target performance ratio to the setting unit 113.

The setting unit 113 registers the received target performance ratio to the QoS setting table 141.

The bandwidth management unit 102 obtains the actual performance ratio using the delay time which is added to the standard response time and the target-set volume. Then, the bandwidth management unit 102 notifies expansion or reduction of a bandwidth using the target performance ratio and the actual performance ratio to the bandwidth control unit 252. For example, when the target performance ratio is greater than the measured performance ratio, the bandwidth management unit 102 notifies expansion of the bandwidth of the target-set volume to the bandwidth control unit 252. Further, when the target performance ratio is smaller than the measured performance ratio, the bandwidth management unit 102 notifies reduction of the bandwidth of the target-set volume to the bandwidth control unit 252.

Next, referring to FIG. 17, a process of the operation management server 1 will be explained. FIG. 17 is a flowchart of a bandwidth tuning process of the operation management server according to the fifth embodiment. Here, in FIG. 17, only the process of the operation management server is illustrated; however, in parallel to this process, the operation terminal 3 and the storage device 2 execute the process same as the flow of FIG. 8.

The monitoring unit 103 receives an instruction to start the performance measurement from the operation terminal 3. Then, the monitoring unit 103 instructs the performance information acquisition unit 251 of the storage device 2 to start the performance measurement (step S71).

The reception unit 111 receives the performance level from the operation terminal 3. Then, the reception unit 111 writes the received performance level to the performance setting table 145. Next, the target value calculation unit 112 reads the performance level of each target-set volume from the performance setting table 145. Further, the target value calculation unit 112 acquires the target performance ratio corresponding to the target performance (step S72).

The target value calculation unit 112 writes the target performance ratio of each target-set volume to the QoS setting table 141 (step S73).

After that, the display control unit 105 reads the target performance ratio of each target-set volume from the QoS setting table 141 and notifies the same to the operation terminal 3 (step S74).

The monitoring unit 103 acquires performance information of the volumes and the resources (step S75). Then, the monitoring unit 103 registers the volume performance information to the volume performance information file 143 and registers the resource performance information to the resource performance information file 144.

The bandwidth management unit 102 reads performance information of the volumes and the resources from the volume performance information file 143 and the resource performance information file 144 (step S76).

The bandwidth management unit 102 and the display control unit 105 read the target performance ratio from the QoS setting table 141 (step S77). Further, the bandwidth management unit 102 and the display control unit 105 acquire the measured response time and the delay time from the volume performance information file 143. Next, the bandwidth management unit 102 and the display control unit 105 obtain measured performance ratio based on the measured response time and the delay time. Then, the display control unit 105 transmits the target performance ratio and the measured performance ratio to the operation terminal 3.

Further, the bandwidth management unit 102 executes the bandwidth tuning process (step S78).

The bandwidth management unit 102 judges whether or not to stop the bandwidth tuning process (step S79). For example, when an instruction to stop the bandwidth tuning process from the operator is received via the operation terminal 3, the bandwidth management unit 102 judges to stop the bandwidth tuning process.

When it is judged not to stop the bandwidth tuning process (step S79: No), the process of the bandwidth management unit 102 returns to step S75. On the other hand, when it is judged to stop the bandwidth tuning process (step S79: Yes), the bandwidth management unit 102 ends the bandwidth tuning.

As explained above, the storage management device according to the present embodiment, the bandwidth tuning is executed using the performance ratio corresponding to the designated performance level. The performance ratio is a ratio with respect to the maximum performance and can be easily set sensuously. Thus, compared to the case of using a response time or an IOPS, the target value can be easily set.

Further, the storage management device according to the present embodiment can execute the bandwidth tuning corresponding to the performance ratio regardless of the data amount used in the process. Thus, for example, even when the data amount of the volume set as "high performance" is a small amount and the data amount of the volume set as "middle performance" or "low performance" is a large amount, the volume set as "high performance" is allocated with a bandwidth which can provide a high performance. In other words, even when the data amount changes, designated performance can be easily maintained.

Further, in the fifth embodiment, a control of the bandwidth is executed using the target performance ratio when any performance level is designated. However, for each performance level, it may be determined whether to use a target performance ratio or a target value such as a response time and an IOPS.

For example, in the band tuning with the performance ratio, the operation management server 1 evaluates that the maximum performance can be obtained when the delay time is made to be zero. However, in actual, when heavily-loaded businesses share the same resource, a delay occurs in a heavily-loaded resource and a maximum performance is not achieved even if the delay time is made to be zero. On the other hand, when the response time or the like is used, when heavily-loaded businesses share the same resource, a target value cannot be achieved and the operation management server 1 does not recognize that the target is achieved. Thus, the operator can use the information provided by the operation management server 1 to begin to execute the performance tuning.

Then, for example, for the performance level which is preferable to be achieved to the designated performance, a response time or the like may be used and, for the performance level which unachieved performance can be accepted, a performance ratio or the like may be used. Concretely, for the volume bandwidth tuning of the high performance, a response time can be used, and for the volume bandwidth tuning of the middle performance and low performance, a performance ratio can be used.

Sixth Embodiment

Next, a sixth embodiment will be explained. An operation management server according to the present embodiment can accept a performance level or a numerical value for each volume as a target performance. The operation management server according to the present embodiment can also be expressed by the block diagram of FIG. 3. In the following explanation, functions same as the functions of each unit explained in the first to fifth embodiments will be omitted. In the present embodiment, a case that a response time is used as a performance index will be explained.

Figure 18A:
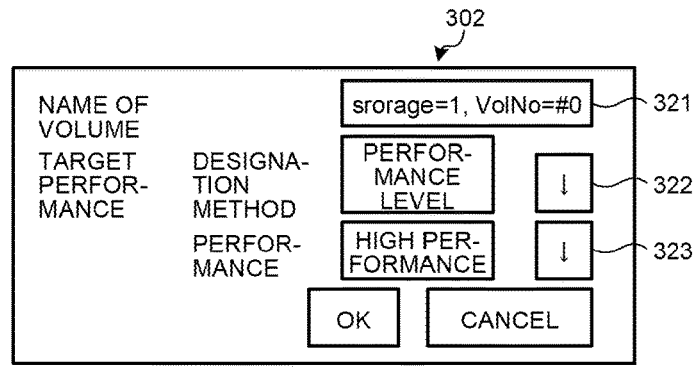
FIG. 18A is a diagram of an example of a target performance input screen according to a sixth embodiment.
Figure 18B:
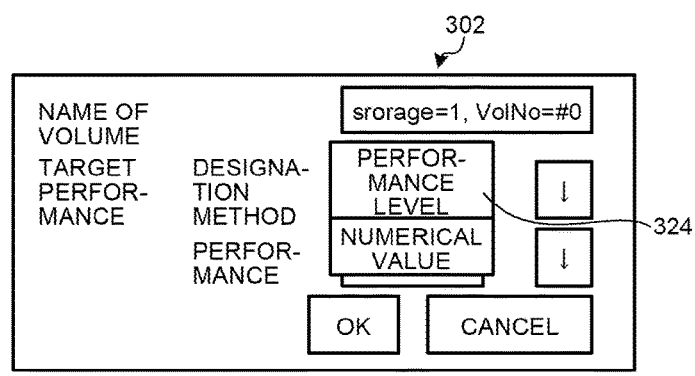
FIG. 18B is a diagram of an example of a designation method selection screen.
Figure 18C:
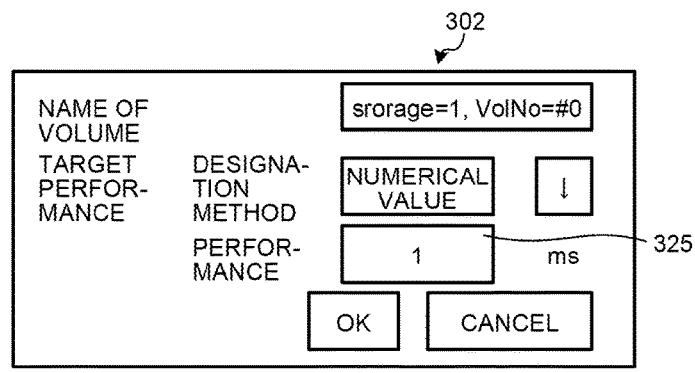
FIG. 18C is a diagram of an example of a target performance input screen using a numerical value.

FIG. 18A is a diagram of an example of a target performance input screen according to a sixth embodiment. FIG. 18B is a diagram of an example of a designation method selection screen. FIG. 18C is a diagram of an example of an input screen of target performance using a numerical value.

When the operator is made to input a target performance of each volume 232, the display control unit 105 controls the monitor of the operation terminal 3 to display an input screen 302 illustrated in FIG. 18A. In the present embodiment, a case that the display control unit 105 controls the target performance input screen by performance levels to be displayed as an initial screen will be explained. A button 322 is a button to display a list of designation methods. Further, a button 323 is a button to display a list of performances.

The operator inputs identification information of a target-set volume in a volume name input field 321. Then, when a designation by performance levels is used as a target performance designation method, the operator selects a performance level similarly to the first embodiment.

On the other hand, when switching the target performance designation method to a numerical value input, the display control unit 105 receives the selection by the button 322 using the input device such as a mouse by the operator. Upon receiving the selection by the button 322, the display control unit 105 controls the monitor of the operation terminal 3 to display a designation method list 324 as illustrated in FIG. 18B. The operator selects the designation method to be used from the designation method list 324 by using the input device.

For example, when numerical values are selected as a selection method, the display control unit 105 controls the monitor to display the numerical values as the designation method and controls the monitor to display a target value input field 325, as illustrated in FIG. 18C.

Here, when switching to the target performance designation using the numerical values in the condition that the target performance is designated using the performance levels, the display control unit 105 may control the target value input field 325 to display an actually measured response time or a target response time as the initial value. With this, the operator can easily recognize how much the performance needs to be tuned from the current condition.

The operator inputs a target value in the target value input field 325 using an input device such as a keyboard.

The reception unit 111 receives an input of the target performance designation method and the target performance of a performance level or a target value. Then, the reception unit 111 registers the received information to the performance setting table 145.

FIG. 19 is a diagram of an example of a performance setting table according to the sixth embodiment. In the present embodiment, the performance setting table 145 has a column for target performance designation methods and a column for target performance corresponding to the respective designation methods. The reception unit 111 registers the designation method and the target performance as associating with the identification information of the volumes.

The target value calculation unit 112 acquires the designation method of the target-set volume and the target performance from the performance setting table 145. When the designation method is performance levels, the target value calculation unit 112 calculates a target value corresponding to the performance level. On the other hand, when the designation method is numerical values, the target value calculation unit 112 uses the acquired value as a target value. Then, the target value calculation unit 112 transmits the target value to the setting unit 113.

As explained above, the storage management device according to the present embodiment can select, as a target performance designation method, whether selecting a performance level or directly inputting a numerical value. With this, the storage management device can provide two merits which are a target value setting with a simple operation and a specific target value setting.

Seventh Embodiment

Next, a seventh embodiment will be explained. An operation management server according to the present embodiment provides a target achievement rate to the operator. The operation management server according to the present embodiment can also be illustrated by the block diagram of FIG. 3. In the following explanation, functions same as the functions of each unit explained in the first to sixth embodiments will be omitted. In the present embodiment, a case in which a response time is used as a performance index will be explained.

The display control unit 105 acquires a target response time from the QoS setting table 141. Further, the display control unit 105 acquires a measured response time from the volume performance information file 143.

Then, the display control unit 105 divides the target response time by the measured response time to obtain a target achievement rate. Then, the display control unit 105 transmits an achievement rate of each target-set volume to the operation terminal 3. The display control unit 105 executes the calculation and the transmission of the target achievement rate at certain intervals. For example, the display control unit 105 executes the calculation and transmission of the target achievement rate at every one or two minutes.

The operation terminal 3 displays the received target achievement rate on the monitor or the like and provides information to the operator.

Here, the display control unit 105 may transmit other information such as a bandwidth throttling range and a performance level to the operation terminal 3 in addition to the achievement rate. Then, the operation terminal 3 may display the received information as a list as illustrated in a target achievement rate notification screen 303 of FIG. 20. FIG. 20 is a diagram of an example of the target achievement rate notification screen. The display control unit 105 is an example of an "informing unit."

Figures 21, 22:
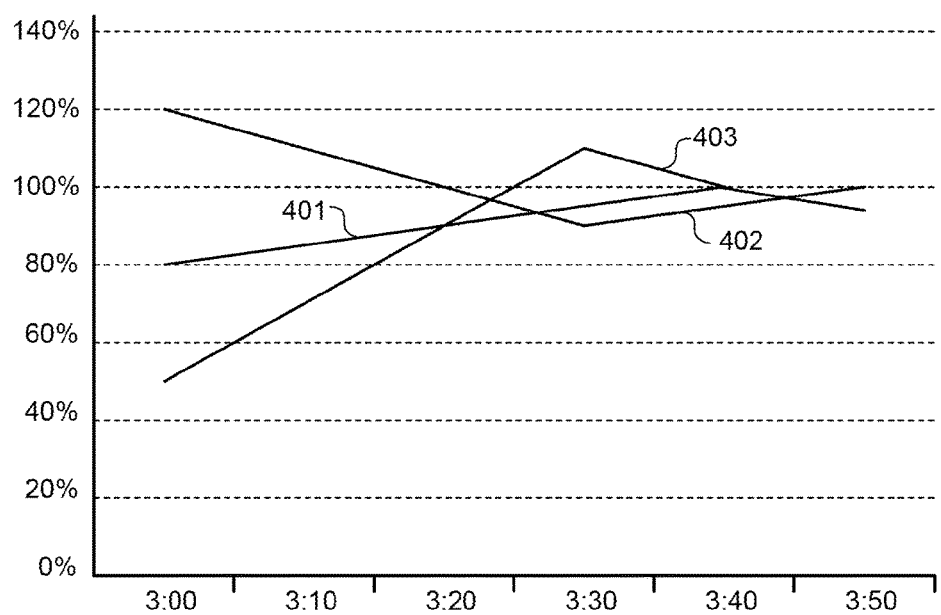
FIG. 21 is a diagram of an example of a chart that expresses transition of a target achievement rate.
FIG. 22 is a diagram of another example of the target achievement rate notification screen.

Further, the display control unit 105 may store the target achievement rate for each target-set volume and provide a transition of the target achievement rates as a chart to the operation terminal 3. FIG. 21 is a diagram of an example of a chart that expresses the transition of the target achievement rate. In the chart in FIG. 21, the longitudinal axis represents the achievement rate and the horizontal axis represents the calculation time.

The line 401 represents the transition of the target achievement rate of the volume 232 which is supposed to have high performance. The line 402 represents the transition of the target achievement rate of the volume 232 which is supposed to have middle performance. The line 403 represents the transition of the target achievement rate of the volume 232 which is supposed to have low performance.

The operation terminal 3 displays a chart that expresses the transition of the target achievement rate illustrated in FIG. 21, which is received from the display control unit 105 on the monitor or the like to provide the information to the operator.

Further, when the bandwidth is tuned by using a performance ratio, the display control unit 105 may use the value which is calculated by dividing an actually measured performance ratio by the target performance ratio as an achievement rate.

As explained above, the storage management device according to the present embodiment can provide the target achievement rate of each target-set volume to the operator. With this, the operator can easily see the convergence condition of the performance of each volume.

Modification Example

Regarding the provision of information explained in the seventh embodiment, the information may be further processed and the display may be changed so that the operator can recognize the information intuitively.

FIG. 22 is a diagram of another example of the target achievement rate notification screen. The display control unit 105 calculates a ratio of the volumes of the middle performance and low performance with respect to the high performance in case that the target is achieved while the achievement rate in a case that the target of the volume of the high performance is achieved is assumed as 100%. For example, the display control unit 105 uses a ratio of the target value for each performance level. Concretely, when the target value in the case of the high performance is 1 ms and the target value of the low performance is 5 ms, the display control unit 105 obtains that the achievement rate of the volume of low performance is 20% of the achievement rate of the volume of high performance based on the ratio.

Here, when the performance value of the performance level is a fixed value, since the target value does not vary, the ratio among performance levels does not change. In this case, the display control unit 105 can obtain the ratio among performance levels simply by obtaining the rate of the target value. Here, every time the performance value with respect to the performance level is calculated, the ratio among the performance levels may vary. When the ratio among the performance levels varies in this manner, the operator has difficulty to confirm the convergence condition of the bandwidth of each volume. Thus, in order to easily recognize the transition of the achievement rate of each performance level, it is preferable to maintain the ratio among the performance levels not to vary. In the present embodiment, since the rate of the target value of each performance level is the ratio between the performance levels, it is preferable to decide a fixed target value to obtain an achievement rate. Here, in the present embodiment, the display control unit 105 uses an average value of the target values within a predetermined period of time as a fixed target value. In addition to this, the display control unit 105 may use an average value of all the stored target values as a fixed target value. Further, when the achievement rate is expressed in a chart, the display control unit 105 may use an average value of the target values within a range displayed in the chart as a fixed target value.

In the present embodiment, when the target of the volume set as middle performance is achieved, the achievement rate is assumed to be 50% with respect to the achievement rate of a case that the target of the volume set as high performance is achieved. Further, when the target of the volume set as low performance is achieved, the achievement rate is assumed to be 25% with respect to the achievement rate of a case that the target of the volume set as high performance is achieved.

In other words, the display control unit 105 calculates 50% for the calculation result of the achievement rate of the volume of middle performance and sets it as an achievement rate. Further, the display control unit 105 calculates 25% for the calculation result of the achievement rate of the volume of low performance and sets it as achievement rate.

In this modification example, the data of the seventh embodiment illustrated in FIG. 20 is modified as FIG. 22. Regarding the volume of high performance, the achievement rate is not changed. In contrast, regarding the volume of middle performance, the achievement rate is 110% in FIG. 20 but 55% in FIG. 22. Further, regarding the volume of low performance, the achievement rate is 100% in FIG. 20 but 25% in FIG. 22.

Figure 23:
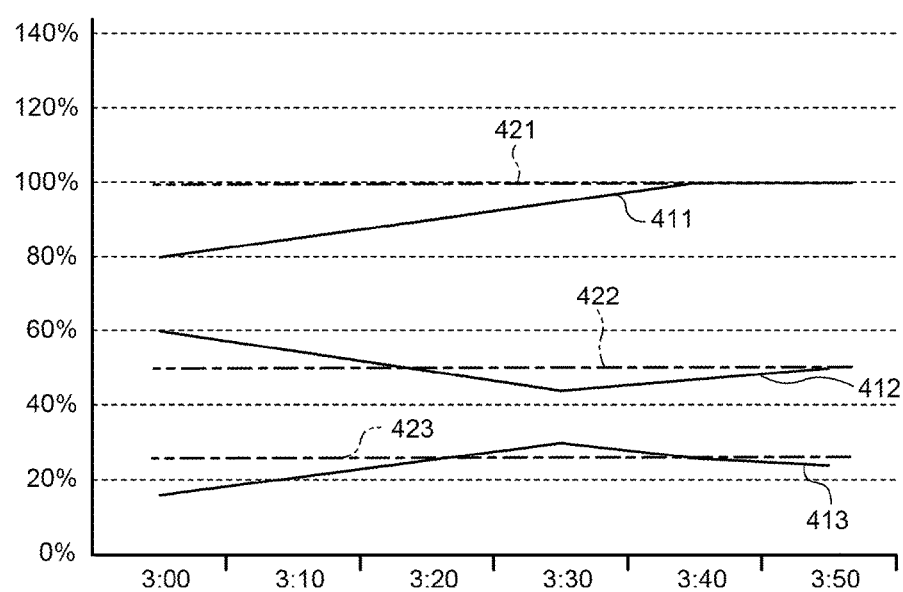
FIG. 23 is a diagram of another example of the chart that expresses transition of the target achievement rate.

Further, in this case, the display control unit 105 can create a chart illustrated in FIG. 23. FIG. 23 is a diagram of another example of the chart that expresses the transition of the target achievement rate. In the chart of FIG. 23, the longitudinal axis represents the achievement rate and the horizontal axis represents the calculation time.

The line 411 represents the transition of the target achievement rate of the volume 232 of high performance. Then, the dot-dash line 421 represents the fixed target value of high performance. Further, the line 412 represents the transition of the target achievement rate of the volume 232 of middle performance. The dot-dash line 422 represents the fixed target value of middle performance. Further, the line 413 represents the transition of the target achievement rate of the volume 232 of low performance. The dot-dash line 423 represents the fixed target value of low performance.

In this manner, by obtaining the achievement rate using the ratio between the performance levels, an achievement rate of the highest performance of the bandwidth of the volume of each performance level can be provided. Further, with the ratio between the performance levels, the achievement rate of the target value may be recognized based on the achievement rate of the highest performance. Further, when it is expressed in a chart, it becomes easier to distinguish the volume of each performance level and the achievement rate and the convergence condition can be recognized more easily.

According to an aspect of the storage management device, the performance tuning method, and the performance tuning program disclosed in this application, proper performance tuning in the storage system using bandwidth throttling range can be easily executed.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A storage management device that manages a storage device including a plurality of storage units and executing data transmission and reception with respect to the storage units via a transmission resource, the storage management device comprising:
a memory that stores a procedure including executable instructions and a setting information of all of the storage units;
a processor coupled to the memory and configured to:
receive an input of designation of a selection of some or all of the storage units and a type of a performance level for an object volume in the storage units;
obtain a target value of performance set of data transmission and reception with respect to the selected storage units according to the input performance level;
register, in the setting information, the obtained target value for the selected storage units;
monitor a load factor of the transmission resource;
select one storage unit of which the target value is registered in the setting information among all of the storage units;
select one resource based on the load factor among the transmission resources that are used by the selected one storage unit;
specify sharing storage units that share the selected one resource;
select a plurality of first storage units of which the target value is registered in the setting information from the sharing storage units;
reserve adjustment of a bandwidth in the first storage units and second storage units of which the target values is not registered in the setting information among the sharing storage units based on the target value;
decide a bandwidth allocation of the sharing storage units based on the reservation of the adjustment of the bandwidth; and
instruct the storage device to tune the bandwidth using the decided bandwidth allocation.

2. The storage management device according to claim 1, wherein the processor is configured to calculate the target value based on a target value at a cache hit and a target value at a cache miss corresponding to each performance level.

3. The storage management device according to claim 2, wherein the processor is configured to calculate the target value by dividing performance at a cache hit corresponding to each performance level into a part proportional to a data size and a part unproportional to the data size and dividing performance at a cache miss corresponding to each performance level into a part proportional to the data size and a part unproportional to the data size in the data transmission and reception to and from the selected storage units.

4. The storage management device according to claim 1, wherein the processor is configured to calculate the target value for each performance level according to a type of the storage units.

5. The storage management device according to claim 1, wherein
the storage units comprises hard disks having different processing speed, and
the processor is configured to calculate the target value according to a ratio of the hard disks having different processing speed in the storage units.

6. The storage management device according to claim 1, wherein the processor is configured to obtain, as the target value, a ratio of the target value of performance of the storage units corresponding to the input performance level to a measured value of performance of the storage units.

7. The storage management device according to claim 1, wherein the processor is configured to use, as the target value, one or a combination of a response time, a number of reading or writing per second, and a throughput.

8. The storage management device according to claim 1, wherein the processor is configured to display an input screen that selectably displays a list of performance levels to be designated for the storage units, and
receive an input of the performance level which is selected from the list on the input screen.

9. The storage management device according to claim 1, wherein the processor is configured to inform a tuning condition of the bandwidth based on a measured value of performance of the sharing storage units in the tuned bandwidth tuned by the storage device according to the instruction from the processor and a target value, which is calculated, of performance.

10. A performance tuning method of a storage system that comprises a storage device including a plurality of storage units and executing data transmission and reception with respect to the storage units via a transmission resource and a storage management device that comprises a memory that stores a procedure including executable instructions and a setting information of all of the storage units, the performance tuning method causing the storage management device to execute:
    receiving selection of some or all of the storage units and a type of a performance level for an object volume in the selected storage units;
    obtaining a target value of performance set of data transmission and reception with respect to the storage units according to the received performance level;
    registering, in the setting information, the target value obtained for the selected storage units;
    monitoring a load factor of the transmission resource;
    selecting one resource based on the load factor among the transmission resources that are used by the selected one storage unit;
    specifying sharing storage units that share the selected one resource;
    selecting a plurality of first storage units of which the target value is registered in the setting information from the sharing storage units;
    reserving adjustment of a bandwidth in the first storage units and second storage units of which the target values is not registered in the setting information among the sharing storage units based on the target value;
    deciding, a bandwidth allocation of the sharing storage units based on the reservation of the adjustment of the bandwidth, and
the storage device to execute
tuning the bandwidth of the sharing storage units according to the bandwidth allocation decided by the storage management device.

11. A non-transitory computer-readable recording medium having stored therein a performance tuning program of a storage management device that manages a storage device comprising a plurality of storage units and executing data transmission and reception with respect to the storage units via a transmission resource and that has a memory that stores a procedure including executable instructions and a setting information of all of the storage units, the performance tuning program causes a computer to execute a process comprising:
    receiving a selection of some or all of the storage units and a type of a performance level for an object volume in the selected storage units;
    obtaining a target value of performance set of data transmission and reception with respect to the storage units according to the received performance level;
    registering, in the setting information, the target value obtained for the selected storage units;
    monitoring a load factor of the transmission resource;
    selecting one resource based on the load factor among the transmission resources that are used by the selected one storage unit;
    specifying sharing storage units that share the selected one resource;
    selecting a plurality of first storage units of which the target value is registered in the setting information from the sharing storage units;
    reserving adjustment of a bandwidth in the first storage units and second storage units of which the target values is not registered in the setting information among the sharing storage units based on the target value;
    deciding, a bandwidth allocation of the sharing storage units based on the reservation of the adjustment of the bandwidth; and
    tuning the bandwidth of the sharing storage units according to the decided bandwidth allocation.

12. The storage management device according to claim 1, wherein the processor is configured to calculate an average value of performance per IO unit size, acquired a measured value of the IO size for one piece of data, and calculate the target value of performance by multiplying the calculated average value of performance per IO unit size and the acquired measured value.

13. The storage management device according to claim 1, wherein the processor is configured to monitor a load factor of a switch, a communication adaptor, a central processing unit and a Redundant Array of Inexpensive Disks (RAID) group which is the transmission resource.

* * * * *